(12) United States Patent
Yoshida

(10) Patent No.: US 7,589,873 B2
(45) Date of Patent: Sep. 15, 2009

(54) SETTING A COLOR TONE TO BE APPLIED TO AN IMAGE

(75) Inventor: Seishin Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 693 days.

(21) Appl. No.: 11/070,551

(22) Filed: Mar. 1, 2005

(65) Prior Publication Data

US 2005/0200868 A1    Sep. 15, 2005

(30) Foreign Application Priority Data

Mar. 2, 2004  (JP)  ............... 2004-057704
Jul. 23, 2004  (JP)  ............... 2004-215744

(51) Int. Cl.
*H04N 1/46* (2006.01)

(52) U.S. Cl. ............... 358/518; 358/1.9; 358/2.1; 358/521; 358/500; 358/504

(58) Field of Classification Search ............... 358/1.1, 358/1.9, 1.13, 500, 501, 518, 534, 520, 521
See application file for complete search history.

(56) References Cited

U.S. PATENT DOCUMENTS

| | | | | |
|---|---|---|---|---|
| 6,323,969 | B1 * | 11/2001 | Shimizu et al. | 358/523 |
| 6,798,536 | B1 * | 9/2004 | Muramoto | 358/1.9 |
| 2001/0028471 | A1 * | 10/2001 | Hirokazu | 358/1.13 |
| 2002/0054301 | A1 * | 5/2002 | Iwai et al. | 358/1.2 |
| 2003/0038870 | A1 * | 2/2003 | Shimada | 347/100 |
| 2003/0072015 | A1 * | 4/2003 | Fujino | 358/1.9 |
| 2004/0001229 | A1 * | 1/2004 | Hanyu | 358/2.1 |
| 2004/0021713 | A1 * | 2/2004 | Mizoguchi et al. | 347/7 |
| 2006/0012809 | A1 * | 1/2006 | Shimada | 358/1.9 |
| 2008/0055679 | A1 * | 3/2008 | Yoshida | 358/518 |

FOREIGN PATENT DOCUMENTS

| | | |
|---|---|---|
| JP | 05-210719 | 8/1993 |
| JP | 11-355584 | 12/1999 |
| JP | 2000-013628 | 1/2000 |
| JP | 2003-264709 | 9/2003 |
| JP | 2003-264710 | 9/2003 |

OTHER PUBLICATIONS

Abstract of Japanese Patent Publication No. 05-210719, Pub. Date: Aug. 20, 1993, Patent Abstracts of Japan.

(Continued)

*Primary Examiner*—Mark K Zimmerman
*Assistant Examiner*—Kent Yip
(74) *Attorney, Agent, or Firm*—Martine Penilla & Gencarella, LLP

(57) ABSTRACT

When setting a color tone during editing of an image, processes such as the following are performed. First, there is displayed a tone setting screen 200 that includes a tone specifying portion 210 for substantially specifying a plurality of color tone parameters that specify the tone of an image; and a sample image display area 220 for displaying a color sample image. Next, the plurality of color tone parameters are specified through the tone specifying portion 210. Then, the tone of the color sample image is adjusted with reference to the specified plurality of color tone parameters. Then, the plurality of color tone parameters are confirmed.

20 Claims, 17 Drawing Sheets

OTHER PUBLICATIONS

Abstract of Japanese Patent Publication No. 11-355584, Pub. Date: Dec. 24, 1999, Patent Abstracts of Japan.
Abstract of Japanese Patent Publication No. 2000-013628, Pub. Date: Jan. 14, 2000, Patent Abstracts of Japan.
Abstract of Japanese Patent Publication No. 2003-264709, Pub. Date: Sep. 19, 2003, Patent Abstracts of Japan.
Abstract of Japanese Patent Publication No. 2003-264710, Pub. Date: Sep. 19, 2003 Patent Abstracts of Japan.

* cited by examiner

PARAMETERS Ic, Im, Iy FOR CORRESPONDING POINT Pt4 OF ANY POINT Pcc4 IN THE INK COLOR CIRCLE $$Ic = \frac{Qc}{Qc + Qm + Qy}$$

$$Im = \frac{Qm}{Qc + Qm + Qy}$$

$$Iy = \frac{Qy}{Qc + Qm + Qy}$$

$$Qc = \overline{Pt4\ Pvc},\ Qm = \overline{Pt4\ Pvm},\ Qy = \overline{Pt4\ Pvy}$$

SETTING A COLOR TONE TO BE APPLIED TO AN IMAGE

BACKGROUND OF THE INVENTION

1. Field of the Invention

The present invention relates to a technology for setting a color tone to be applied to an image.

2. Description of the Related Art

To date, there have been disclosed a number of technologies for applying desired color to, and displaying or printing, monochrome images that contain only lightness information. Tones applied to monochrome images include cool-hued tones (hereinafter "cool tones"), warm-hued tones (hereinafter "warm tones"), and color shade resembling a discolored photograph (hereinafter "sepia tones").

In JP5-210719A, for example, there is disclosed a technology for editing an image by specifying the particulars of image editing through a display screen.

However, in the technology mentioned above it is not possible to adjust editing particulars while viewing the image resulting from the editing.

With the foregoing in view, it is an object of the present invention to provide a technology whereby a color tone to be applied to an image can be set easily.

The present invention is related to Japanese patent applications No. 2004-057704, filed Mar. 2, 2004 and No. 2004-215744, filed Jul. 23, 2004; the contents of which are incorporated herein by reference.

SUMMARY OF THE INVENTION

To achieve this object, in the present invention, the following processes are carried out during image editing.

A tone setting screen is displayed on the display. The tone setting screen includes: a tone specifying portion for specifying a plurality of color tone parameters that specify a color tone; and a sample image display area for displaying a sample image. The plurality of color tone parameters are specified through the tone specifying portion. Based on the specified plurality of color tone parameters, a display conversion table for adding a color tone to a reference image is generated. The sample image is generated by adding the color tone to the reference image with reference to the display conversion table. The sample image is displayed in the sample image display area. Based on the specified plurality of color tone parameters, a printing conversion table for adding the color tone to a print target image to be printed is generated. By means of this arrangement, it is possible to determine a color tone to be applied to an image for printing, while viewing the result of applying the tone.

It is preferable that the reference image is an image in which color of pixels is one color in the predetermined color series. According to such an embodiment, the user can accurately ascertain change in tone between the reference image to which tone is not applied, and the sample image to which tone is applied. As a result, the user can more accurately ascertain the tone being applied.

It is also preferable that the tone setting screen further comprises a reference image display area for displaying the reference image. According to such an embodiment, the user can accurately ascertain change in tone by comparing the reference image with the sample image. As a result, the user can more accurately ascertain the tone being applied.

It is preferable that the print target image is an image in which color of each pixel is color in a predetermined color series. The color series is a collection of a plurality of colors with substantially same hue and mutually different lightness. On the other hand, the print target image may be an ordinary color image.

It is preferable that the reference image is selected from among a plurality of candidate images prepared in advance, when displaying the tone setting screen. According to such an embodiment, samples of tone application can be shown by a simple process.

An embodiment is also possible wherein the print target image is selected as the reference image, after receiving the print target image. The reference image may be generated based on the print target image without adding color tone is also possible. According to such an embodiment, color tone to be added to the image can be determined while viewing the sample image based on an actual print target image.

The following embodiment is also preferable. When generating the printing conversion table, a reference printing conversion table is provided. The reference printing conversion table is a table for converting image data to ink amount data without changing colors represented by the image data. An ink intensity table is also provided. The ink intensity table represents correspondence between combinations of various values of the color tone parameters and ink color intensities. Then the printing conversion table is generated from the reference printing conversion table with reference to the ink intensity table and the specified plurality of color tone parameters. According to such an embodiment, a printing conversion table can be generated readily, based on specified tone parameters.

It is preferable that the tone specifying portion has a tone specifying area for specifying the plurality of color tone parameters with a single specified point. The tone specifying area is arranged so as to enable visual recognition of a color tone specified by the specified plurality of color tone parameters. When specifying the plurality of color tone parameters, the specified point is specified within the tone specifying area. When generating the display conversion table, the plurality of color tone parameters are calculated according to location of the specified point within the tone specifying area. According to such an embodiment, color tone can be determined easily, while viewing color tone specified by tone parameters.

The display conversion table is preferably configured to convert colors of pixels in the reference image to other colors. In the conversion using the display conversion table, a color having a predetermined fixed lightness is converted to another color having the fixed lightness, a color having a lightness higher than the fixed lightness is converted to another color having a lightness higher than the fixed lightness, and a color having a lightness lower than the fixed lightness is converted to another color having a lightness lower than the fixed lightness. According to such an embodiment, lightness of the image overall is not likely to change significantly by adding the color tone.

The tone setting screen preferably includes a lightness adjusting portion for substantially specifying a lightness adjustment parameter relating to a lightness of the print target image. In such an embodiment, a process such as the following is preferably carried out. The lightness adjustment parameter is specified through the lightness adjusting portion. Then the display conversion table is modified in accordance with the specified lightness adjustment parameter. According to such an embodiment, the color tone and lightness of the image can be adjusted easily.

The tone specifying area preferably includes an a*b* plane for which a lightness L* in L*a*b* color system is the fixed lightness. The display conversion table is preferably configured to convert a color identified by a*=b*=0 in the a*b* plane to a color identified by the specified point. According to such an embodiment, the color tone addition that converts a color of fixed lightness to another color having fixed lightness can be set.

It is preferable that the display conversion table is configured to convert a first color identified by a*=b*=0 to a second color having a lower saturation than a saturation of the color identified by the specified point. A lightness L* of the first color in the L*a*b* color system is the fixed lightness. According to such an embodiment, in printing, the user can add a color tone perceived to be close to the color tone specified by himself through the displayed tone specifying portion.

It is also preferable that a patch of the color identified by a*=b*=0 is displayed on the tone setting screen, and a patch of the color identified by the specified point is displayed on the tone setting screen. According to such an embodiment, the user can compare colors represented by patches having predetermined area, to confirm whether the color tone specified by the specified point is appropriate. Thus, it is easy to confirm whether the color tone specified by the specified point is appropriate.

In one preferable embodiment, the tone specifying area includes a specified plane for which a lightness L* in L*a*b* color system is the fixed lightness, and values for a* and b* in L*a*b* color system respectively lie within predetermined ranges. In the embodiment, the specified plane includes a specific point, and a color of each point in the specified plane has lower saturation the closer the point is to the specific point. In the preferred embodiment, the following condition will be fulfilled, where D is distance of each point in the specified plane from the specific point, and c is a positive number. Saturation Cv1 of each point within a first area contained within the specified plane and including the specific point fulfills a condition; Cv1<c×D. Saturation Cv2 of each point within a second area located outside the first area fulfills a condition; Cv2≧c×D. According to such an embodiment, there can be arranged a tone setting area such that change in color at points in the specified plane are perceived naturally by the human eye.

The tone specifying area may be a color circle having at a center a gray point having a gray color which can be represented by lightness only. In the color circle, saturation and/or hue of a color at each location may differ gradationally depending on a location within the tone specifying area. The fixed lightness may be a lightness of a color identified by the specified point. According to such an embodiment, based on color identified by the specified point, the color tone to be added can be determined such that lightness of the image overall is not likely to change significantly.

It is preferable that a patch of achromatic color having the fixed lightness is displayed on the tone setting screen; and a patch of the color identified by the specified point is displayed on the tone setting screen. According to such an embodiment, the user can compare colors represented by patches having predetermined area, to confirm whether color tone specified by the specified point is appropriate. Thus, it is easy to confirm whether the color tone specified by the specified point is appropriate.

The display conversion table may be configured to convert a gray at the center of the color circle to a color identified by the specified point. According to such an embodiment, the color tone to be added can be set based on two colors displayed at the color circle center and at the specified point, whereby tone application can be set intuitively.

The printing conversion table may be configured to convert the gray at the center of the color circle to a color having a lower saturation than a saturation of the color identified by the specified point. According to such an embodiment, in printing, the user can decide a color tone perceived to be close to the tone application specified by himself through the displayed tone specifying portion.

It is preferable that a patch of the gray at the center of the color circle is displayed on the tone setting screen; and a patch of the color identified by the specified point is displayed on the tone setting screen after specifying the specified point. According to such an embodiment, the user can compare colors represented by patches having predetermined area, to confirm whether color tone specified by the specified point is appropriate.

Where the image being edited is an image that can be represented by pixel lightness, the following embodiment is possible. In the embodiment, points within the color circle are mapped to corresponding points within an ink color triangle which is a hypothetical equilateral triangle that corresponds to the color circle. The ink color triangle has a center in common with the color circle, and is arranged such that intensities of ink colors at the corresponding point are determined with reference to lengths of three perpendicular lines extending from the corresponding point to three sides of the ink color triangle.

In such an embodiment, when generating the printing conversion table, a reference printing conversion table for converting image data to ink amount data without changing colors represented by the image data is provided. The intensities of the ink colors are calculated with reference to the lengths of the three perpendicular lines. Then the print conversion table is generated from the reference printing conversion table based on the intensities of the ink colors. When generating the display conversion table, a tone parameter table representing correspondence between combinations of various values of the intensities of the ink colors and the color tone parameters is provided. Then the color tone parameters are determined based on the calculated intensities of the ink colors with reference to the tone parameter table. According to such an embodiment, the printing conversion table and the display conversion table can be generated based on the specified point.

The display conversion table is preferably configured to convert colors of pixels in the reference image to other colors. In the conversion using the display conversion table, a color having a predetermined fixed lightness is converted to another color having the fixed lightness, a color having a lightness higher than the fixed lightness is converted to another color having a lightness higher than the fixed lightness, and a color having a lightness lower than the fixed lightness is converted to another color having a lightness lower than the fixed lightness. The fixed lightness is preferably L*=40-60 in L*a*b* color system. According to such an embodiment, the color tone to be added can be determined without the deviation of the lightness in the entire image.

It is preferable that the printing conversion table is configured to convert image data to ink amount data with changing colors represented by the image data. In the conversion using the printing conversion table, a color having the fixed lightness is converted to a color having lower saturation than saturation of the another color having the fixed lightness. According to such an embodiment, in printing, the user can decide a color tone to be added which is perceived to be close to the tone application specified by himself through the displayed tone specifying portion.

It is also preferable to display on the tone setting screen a patch of achromatic color having the fixed lightness; and to display on the tone setting screen a patch of the another color having the fixed lightness. According to such an embodiment, the user can compare colors represented by patches having predetermined area, to confirm whether the color tone specified by the specified point is appropriate.

Where, for example, the invention is reduced in the form of a tone setting device, the tone setting device may comprise an image display unit for displaying an image; an input unit for receiving a user instruction; and a control unit for controlling the image display portion and setting a color tone in accordance with the user instruction.

The invention may be realized through a variety of embodiments, for example, method and device to assist generating a conversion table for adding a color tone, a tone setting method and device, a tone setting assisting method and device, a printing control method and device, a printing method and device, a computer program for realizing the functions of such methods or devices, a recording medium having recorded thereon a computer program for this purpose, and so on.

These and other objects, features, aspects, and advantages of the present invention will become more apparent from the following detailed description of the preferred embodiments with the accompanying drawings.

DETAILED DESCRIPTION OF THE INVENTION

The following description of the embodiments of the invention will be made in the order indicated below.

A. Embodiment 1
B. Embodiment 2
C. Embodiment 3
D. Embodiment 4
E. Embodiment 5
F. Variations A. Embodiment 1

Figure 1:
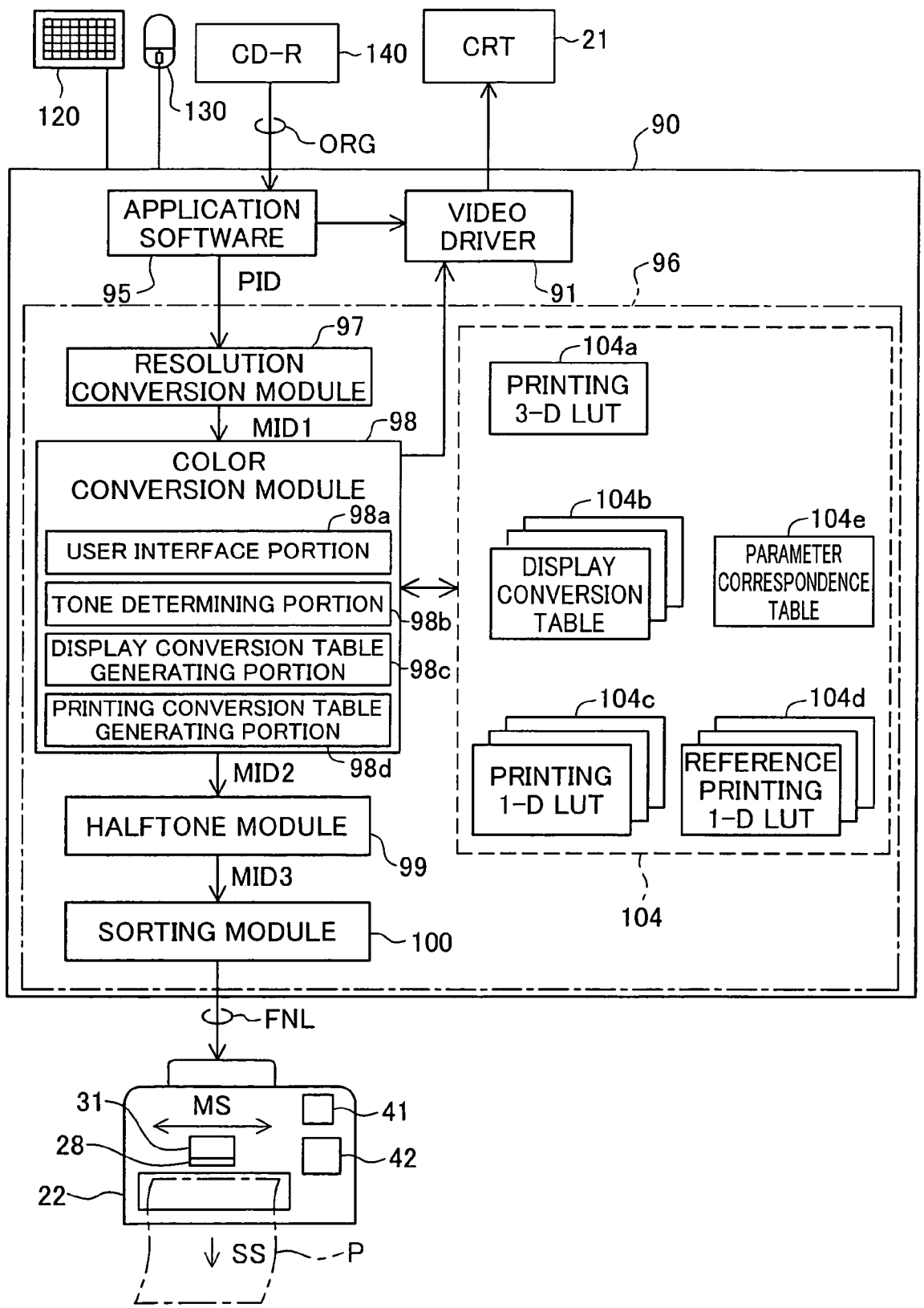
FIG. 1 is a block diagram showing the software arrangement of the printing system of Embodiment 1.

FIG. 1 is a block diagram showing the software arrangement of the printing system of Embodiment 1. On the computer 90, an application 95 runs on a predetermined operating system. The operating system incorporates a video driver 91 and a printer driver 96.

In response to a user instruction input from a mouse 130 or a keyboard 120, the application program 95 reads from a CD-R 140 original image data ORG composed of the three color components red (R), green (G), and blue (B). Then, in response to a instruction from the user, a process such as retouching is carried out on the original image data ORG. The application program 95 displays the processed image on a CRT display, through the agency of the video driver 91. When the application program 95 receives a print command from the user, the application program 95 issues a print instruction to the printer driver 96 and outputs the processed image to the printer driver 96 as preliminary image data PID.

Upon receiving the preliminary image data PID from the application program 95, the printer driver 96 converts it to print image data FNL processable by the printer 22 (here, a multivalue signal for six colors, namely, cyan, magenta, yellow, and first to third achromatic inks).

In the example shown in FIG. 1, the printer driver 96 comprises a resolution conversion module 97, a color conversion module 98, a color conversion table 104, a halftone module 99, and a sorting module 100.

The resolution conversion module 97 converts the resolution of the preliminary image data PID to the resolution at which printing is carried out by the printer 22. During printing of a color image the color conversion module 98, while referring to the three-dimensional lookup table 104a of the color conversion table 104, converts image data MID1 in which colors of pixels are represented by RGB tone values to image data MID2 in which colors of pixels are represented by tone values of the cyan (C), magenta (M), yellow (Y), and first to third achromatic inks (K1-K3) used by the printer 22. The first to third achromatic inks are achromatic inks having increasing lightness in that order. During printing of a monochrome image the color conversion module 98 while referring to the one-dimensional lookup table 104c of the color conversion table 104, converts the monochrome image data MID1 to image data MID2 in which colors of pixels are represented by tone values of the cyan (C), magenta (M), yellow (Y), and first to third achromatic inks (K1-K3).

The halftone module 99 performs halftone processing of the image data MID2 in which color density of pixels is represented by tone value of the colors, to convert it into image data MID3 in which color density is represented in a format based on the dot on-off state (also referred to as "print data" or "dot data").

The image data MID3 generated in this way is sorted by the sorting module 100 in the order in which it will be sent to the printer 22, and output as final print image data FNL.

The printer 22 comprises a mechanism for feeding paper P by means of a feed motor; a mechanism for reciprocating a carriage 31 in the direction MS perpendicular to the paper P feed direction SS, by means of a carriage motor; a print head 28 carried on the carriage 31, for ejecting ink to form dots; P-ROM 42 for storing settings data of various kinds; and a CPU 41 for controlling the feed motor, the carriage motor, the print head 28, the P-ROM 42, and a control panel 32. The printer 22 receives the print image data FNL, and in accordance with the print image data FNL executes printing by forming dots on the printing medium using cyan (C), magenta (M), yellow (Y), and first to third achromatic inks (K1-K3).

Herein, "printing device" refers only to the printer 22 in the narrow sense, but in a wide sense could also represent the printing system that includes the computer 90 and the printer 22.

Figure 2:
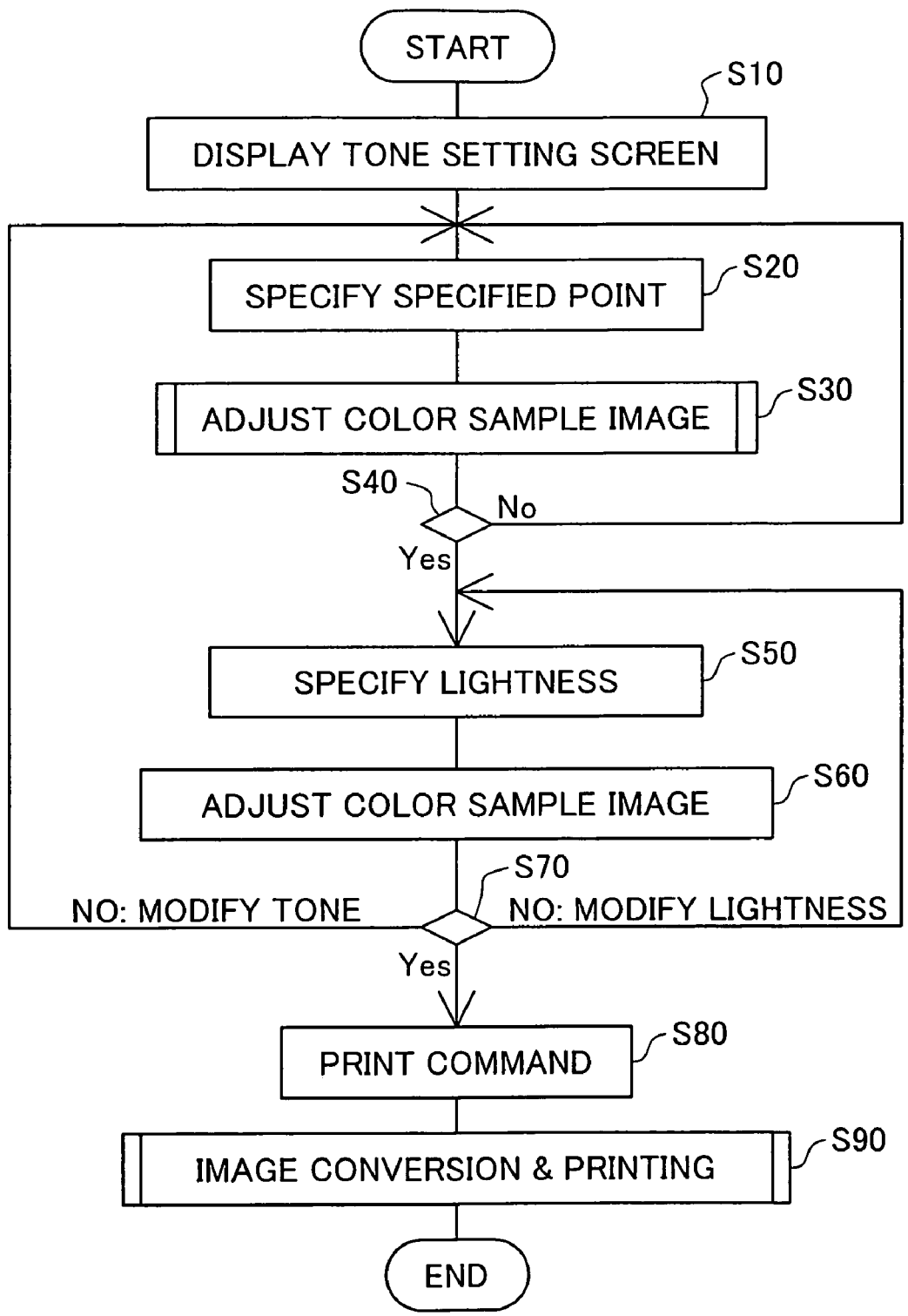
FIG. 2 is a flowchart showing the procedure for printing with a predetermined tone applied to the monochrome image in the printer driver 96.

A2. Color Conversion Process:

FIG. 2 is a flowchart showing the procedure for printing when the preliminary image data PID output by the application program 95 is monochrome image data, with a tone being applied to the monochrome image in the printer driver 96. In the example described here, tone for the monochrome image is set first, and lightness is set subsequently. The "monochrome image" herein may be image data having only lightness information for the pixels that make up the image, or image data having equivalent tone values of red (R), green (G), and blue (B) for each pixel.

Figure 3:
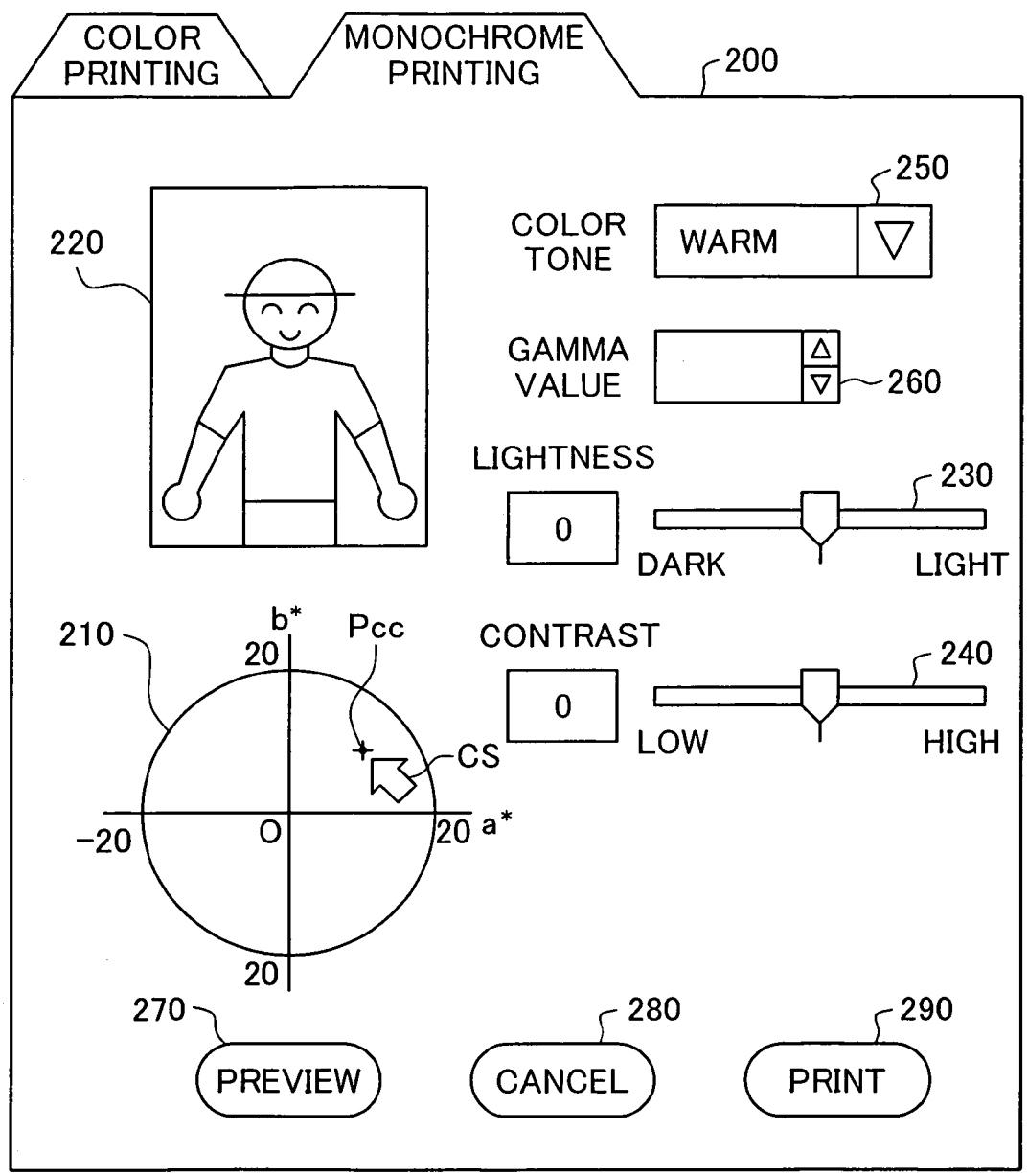
FIG. 3 illustrates the tone setting screen 200 of the printer driver 96.

FIG. 3 is an illustration of the tone setting screen 200 of the printer driver 96. When a print command is received from the application program 95, the user interface screen of the printer driver 96 is displayed on the CRT display 21. If the user selects the monochrome printing tab (see upper left in FIG. 3) in the printer driver 96 user interface screen, in Step S10 in FIG. 2, the tone setting screen 200 shown in FIG. 3 is displayed. The setting screen 200 has a color circle 210 for setting parameters specifying a color tone to be applied to an image; a sample image display area 220 for displaying a sample image; a lightness scale 230 for specifying a lightness parameter that specifies image lightness; and a contrast scale 240 for specifying a contrast parameter that specifies image contrast.

The tone setting screen 200 also has a color tone selecting portion 250 for selecting a setting for a parameter specifying the color tone to be applied to the image, from among a number of presets; and a gamma value specifying portion 260 for specifying a gamma value to be used when performing gamma correction.

The tone setting screen 200 additionally has a Preview button 270 for displaying in the sample image display area 220 a color sample image created by subjecting the preliminary image data PID to image conversion in accordance with parameters that have been set through the color circle 210, the lightness scale 230, the contrast scale 240, the color tone selecting portion 250, and the gamma value specifying portion 260. It also has a Cancel button 280 for canceling the printing process, and a Print button 290 for confirming the set parameters, carrying out image conversion in accordance with the parameters, and executing printing.

In Step S10, when the tone setting screen 200 is displayed, an image created by subjecting the preliminary image data PID to predetermined resolution conversion is displayed in the sample image display area 220. An image prepared in advance may be displayed as the sample image in the sample image display area 220, irrespective of the preliminary image data PID. In preferred practice, the image used when carrying out printing with some tone applied to a monochrome image will be a black-and-white image represented by pixel lightness only.

The color circle 210 represents an a*b* plane when L* is 55 in the L*a*b* color system, and is an area included in a circular of radius 20 whose center point O is a*=b*=0. That is, the color circle 210 is a disk having a gray point at its center, wherein a* and/or b* values differ gradationally depending on location within the color circle 210.

When the tone setting screen 200 is displayed, in Step S20 (see FIG. 2) the user moves the cursor CS using the mouse 130 in order to specify a point within the color circle 210. This point is termed a "specified point Pcc." As noted, the user, by specifying a point in the color circle 210 wherein color component intensity changes gradationally depending on location, can specify a particular tone to be applied to the monochrome image. Thus, a tone can be applied to a monochrome image in an easy and intuitive fashion. Display of the tone setting screen 200 and receiving of user instructions are carried out by the user interface portion 98a which represents a functional portion of the color conversion module 98.

Once a specified point Pcc has been specified, in Step S30 the printer driver 96 adjusts the sample image being displayed in the sample image display area 220, with reference to the location of the specified point Pcc.

Figure 4:
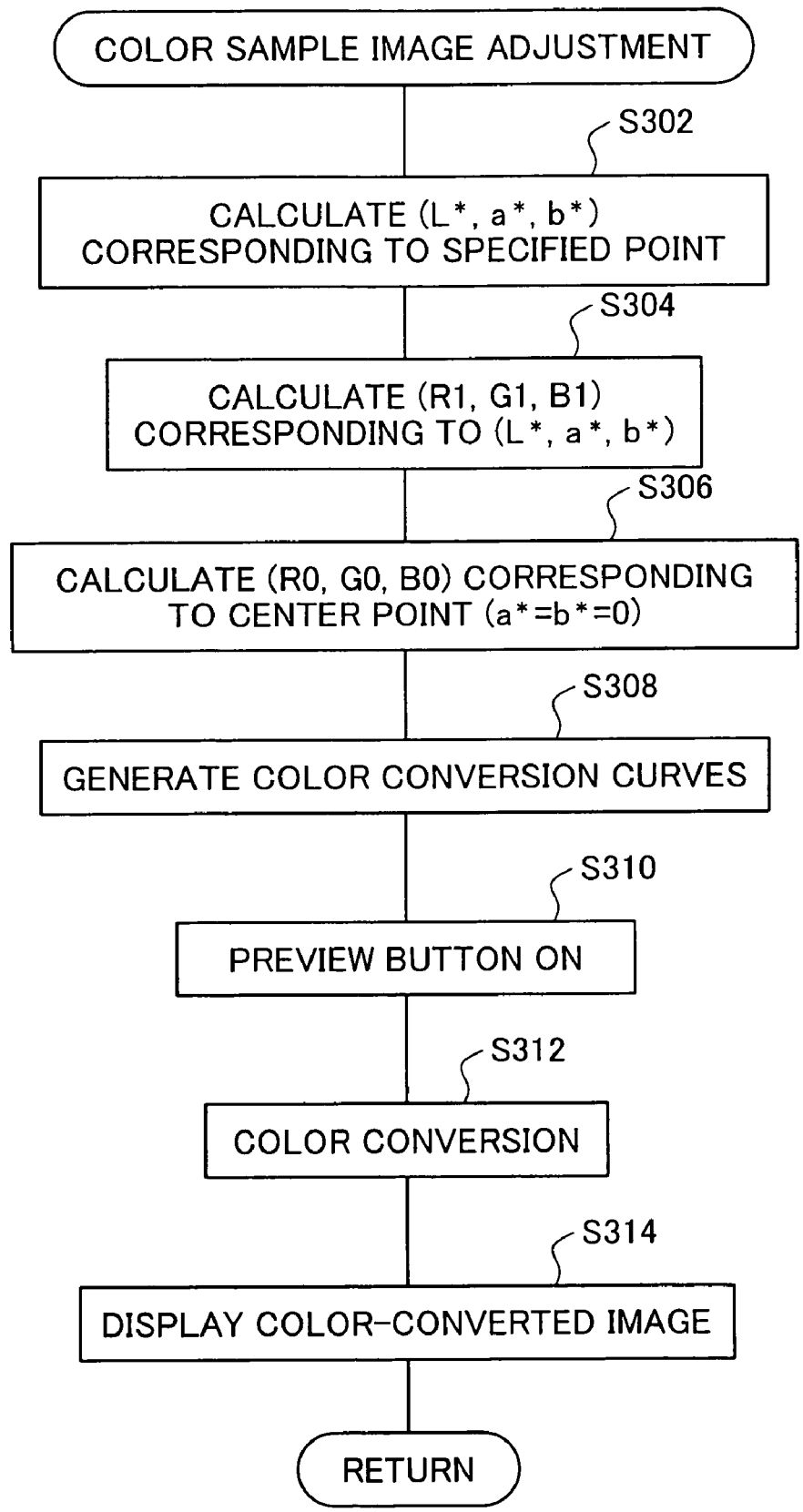
FIG. 4 is a flowchart showing the procedure when adjusting a sample image in Step S30.

FIG. 4 is a flowchart showing the procedure when adjusting a sample image in Step S30 of FIG. 2. Once a specified point Pcc has been specified, the printer driver 96 in Step S302 calculates L*a*b* color system coordinates ($L_0^*$, $a_1^*$, $b_1^*$) representing the same color as the specified point Pcc within the color circle 210. Then, in Step S304, sRGB color system coordinates (R1, G1, B1) representing the same color as the coordinates ($L_0^*$, $a_1^*$, $b_1^*$) are calculated. Here, $L_0^*$ is 55, since the specified point Pcc is a point within the color circle 210, which is the a*b* plane for which L* is 55.

In Step S306 the printer driver 96 calculates sRGB color system coordinates (R0, G0, B0) representing the same color as the center point O of the color circle 210. The center point O of the color circle 210 is represented in the L*a*b* color system as (55, 0, 0). In this way, in accordance with parameters input by the user, there are calculated sRGB color system coordinates (R1, G1, B1) representing the same color as the specified point Pcc, and sRGB color system coordinates (R0, G0, B0) representing the same color as the center point O. These calculations are performed by the tone determining portion 98b which is a functional portion of the color conversion module 98.

Figure 5:
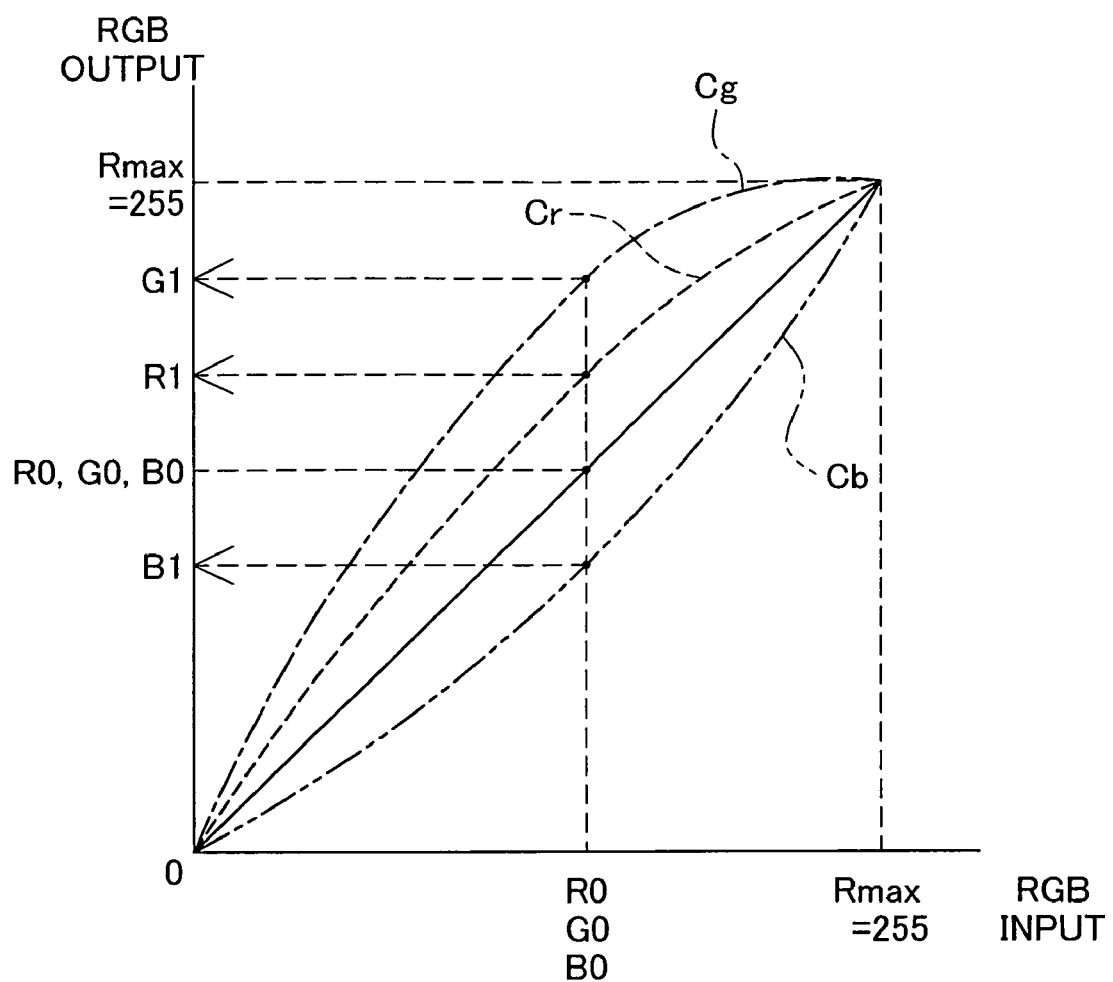
FIG. 5 illustrates color conversion curves Cr, Cg, Cb.

FIG. 5 is an illustration of color conversion curves Cr, Cg, Cb. In Step S308 the printer driver 96, on the basis of (R1, G1, B1) corresponding to the specified point Pcc and (R0, G0, B0) corresponding to the center point O, generates color conversion curves Cr, Cg, Cb. A monochrome image can be represented as an image having mutually equal RGB tone values for each pixel. A color conversion curve specifies, when applying tone to a monochrome image, the manner in which RGB tone values change. The subscripts r, g, b appended to the color conversion curve symbol C represent the colors R, G, B respectively. In FIG. 5, the horizontal axis gives RGB tone value prior to conversion, and the vertical axis gives RGB tone value after conversion. Accordingly, when the RGB tone values have a maximum value of 255, all of the color conversion curves shown in the graph in FIG. 5 pass through the origin (0, 0) and the point (255, 255). Where a color conversion curve is a straight line connecting the origin (0, 0) and the point (255, 255), the color conversion curve represents non-conversion.

For example, the color conversion curve Cr is generated as a quadratic curve passing through the origin (0, 0) and the point (255, 255), as well as through (R0, R1) in FIG. 5. R0 is the tone value which represent the center point O together with G0, B0 (see FIG. 3 and steps S302 and S304 in FIG. 4). R1 is the tone value which represent the specified point Pcc together with G1, B1 (see FIG. 3 and step S306 in FIG. 4). The point (R0, R1) is typically located in proximity to the center of the graph of FIG. 5, in other words, close to a straight line connecting the origin (0, 0) and the point (255, 255). Thus, a quadratic curve passing through the three points of the origin (0, 0) the point (255, 255), and the point (R0, R1) will typically neither exceed the tone value maximum value Rmax, nor go below zero.

In such a color conversion curve Cr, in pixels whose red (R) tone value is 0, the tone value after conversion will be 0 as well. In pixels whose red tone value is 255, the tone value after conversion will be 255 as well. In pixels whose red tone value is R0, the tone value after conversion will be R1. Similarly, the other color conversion curves Cg, Cb are generated on the basis of G0 and G1, and of B0 and B1. In actual practice the color conversion curves Cr, Cg, Cb are generated in the form of a display conversion table 104b that stores converted tone values corresponding to tone values prior to RGG conversion (see FIG. 1).

According to the color conversion curves Cr, Cg, Cb, the gray of (R0, G0, B0) corresponding to the center point, i.e. gray having lightness L* of 55, is converted to the color (R1, G1, B1) corresponding to the specified point Pcc. In this way, the color conversion curves Cr, Cg, Cb convert color represented at the center point O of the color circle 210 into color of a specified point Pcc specified by the user. Thus, the user, using the color circle 210, can set tone while intuitively ascertaining the tone for application to the monochrome image.

Both the center point O and the specified point Pcc lie within the a*b* plane (color circle 210) for which L* is 55 in the L*a*b* color system. Thus, gray pixels for which L*=55 undergo no change in lightness even after being converted.

Where pixel lightness is designated as Y, and pixel red, green and blue tone values as R, G, B, Y=0.299R+0.587G+0.114B. All of the color conversion curves Cr, Cg, Cb in FIG. 5 increase monotonically. In other words, as long as it is not the case that (R1, G1, B1)=(Rmax, Gmax, Bmax), a larger input tone value will give a larger output tone value as well. Rmax, Gmax, Bmax denote maximum values of the maximum length values of red, green, and blue respectively. Thus, with color conversion in accordance with the color conversion curves Cr, Cg, Cb of FIG. 5, color conversion is carried out in the following manner.

Specifically, in color conversion, pixels having color lighter than the L*=55 gray corresponding to the center point are converted to color lighter than L*=55. Pixels having color darker than L*=55 are converted to color darker than L*=55. Thus, gray portions within a monochrome image that are lighter than a predetermined lightness (here, L*=55) are not rendered darker than the predetermined lightness due to application of tone using the color circle, and as a result darkening of the image overall is avoided. Also, gray portions within a monochrome image that are darker than a predetermined lightness are not rendered lighter than the predetermined lightness due to application of tone using the color circle, and as a result lightening of the image overall is avoided.

Color conversion in tone application in this embodiment can consist of color conversion as described below. Specifically, the color of pixels that, of the pixels of an image, have a fixed lightness (e.g. L*=55) is converted to another color having fixed lightness. The color of pixels that, of the pixels of an image, have a lightness greater than the fixed lightness is converted to another color having lightness greater than fixed lightness. The color of pixels that, of the pixels of an image, have a lightness less than the fixed lightness is converted to another color having lightness less than fixed lightness.

In Step S310 (see FIG. 4), when the Preview button 270 (see FIG. 3) is pressed, the printer driver 96 in Step S312 subjects the image obtained by resolution conversion of the preliminary image data PID to color conversion along the color conversion curves Cr, Cg, Cb. The image obtained by color conversion is then displayed in the sample image display area 220 in Step S314. In Step S30 of FIG. 2, a process such as that described above is carried out.

When the sample image is displayed in Step S30 of FIG. 2, in Step S40 the user decides whether the tone of the color sample image is acceptable. In the event that it is desired to further modify tone from the tone of the color sample image, the routine returns to Step S20. In the event that the tone of the color sample image is acceptable, the routine proceeds to Step S50.

In Step S50, the user employs the lightness scale 230 to specify a lightness parameter for the image. In accordance with the specified lightness parameter, the printer driver 96 modifies the shapes of the color conversion curves Cr, Cg, Cb. In the user interface screen of FIG. 3, it is possible for example to have an arrangement whereby if the pointer of the lightness scale 230 is moved to the right, lightness of the image overall increases, whereas if the pointer of the lightness scale 230 is moved to the left, lightness of the image overall decreases. The lightness parameter Lr is specified by the position of the pointer of the lightness scale 230. The shapes of the color conversion curves Cr, Cg, Cb are modified depending on the specified lightness parameter Lr.

Figure 6:
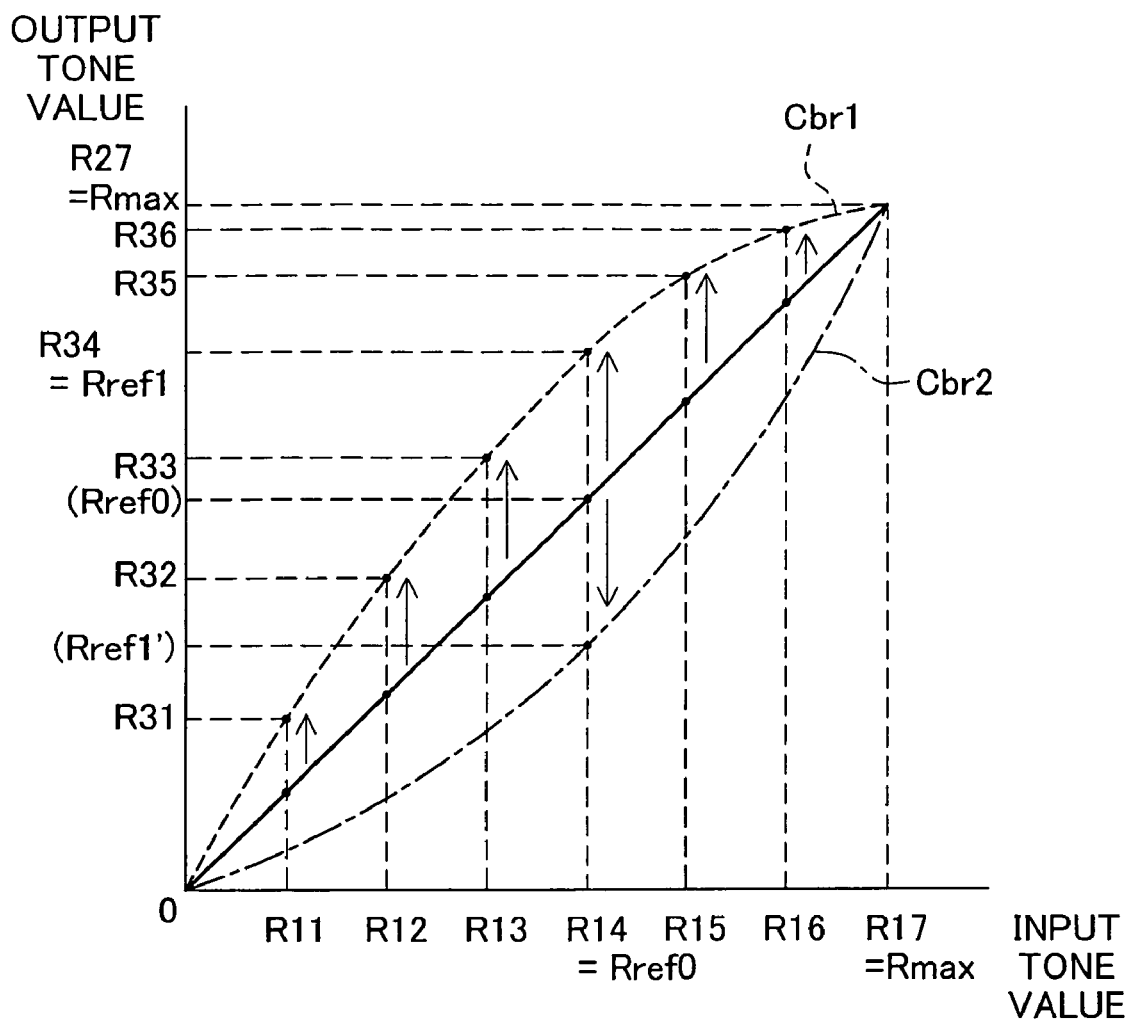
FIG. 6 illustrates lightness conversion curve Cbr.

FIG. 6 is an illustration showing a tone value lightness conversion curve Cbr. Lightness conversion can be carried out in the following manner, for example. When the pointer of the lightness scale 230 is moved to the right, the lightness parameter Lr is set to a value greater than 1. When the pointer of the lightness scale 230 is moved to the left, the lightness parameter Lr is set to a value less than 1. The lightness conversion curve Cbr is set to a shape such as the following, where input tone values are plotted on the horizontal axis and output tone values are plotted on the vertical axis.

Let the reference input tone value Rref0 assume, for example, a value of 128 halfway between 0 and 255. Let Rref1, equal to the reference input tone value Rref0 multiplied by Lr, be designated as the reference output tone value Rref1. The lightness conversion curve Cbr is generated as a curve passing through the origin (0, 0), point (Rmax, Rmax), and (Rref0, Rref1).

Where the lightness parameter Lr is greater than 1, the lightness conversion curve Cbr1 is generated as an upwardly bowed curve as shown as Cbr1 in FIG. 6. Color conversion with this kind of lightness conversion curve Cbr converts tone values to larger values, with the exception of input tone values of 0 and Rmax. For example, in FIG. 6, tone values R11-R16 are respectively converted to the larger values R31-R36. On the other hand, where the lightness parameter Lr is less than 1, the lightness conversion curve Cbr is generated as an downwardly bowed curve as shown as Cbr2 in FIG. 6. Color conversion with this kind of lightness conversion curve Cbr2 converts tone values to smaller values, with the exception of input tone values of 0 and Rmax.

The color conversion curves Cr, Cg, Cb of the colors R, G, B shown in FIG. 5 can each specifically be held in the form of a "color conversion table" which is a group of sample points identified by combinations of input tone values and output tone values. For example, the red color conversion curve Cr can be a color conversion table representing a group of a plurality of sample points including point (0, 0), point (R0, R1), and point (Rmax, Rmax). Here, the combinations of input tone values and output tone values are assumed to be a group of combinations of input tone values which assume integral values of 0-255, and 256 output values corresponding respectively to the input tone values.

The color conversion table could also be a table representing a group of input tone values and output tone values (sample points) fewer in number than 256, for example, 128, 64, 32, or 16. When converting tone values using such a color conversion table, for input tone values not included in the table, output values derived by interpolating among output values included in the table will preferably be given as output values.

Figure 7:
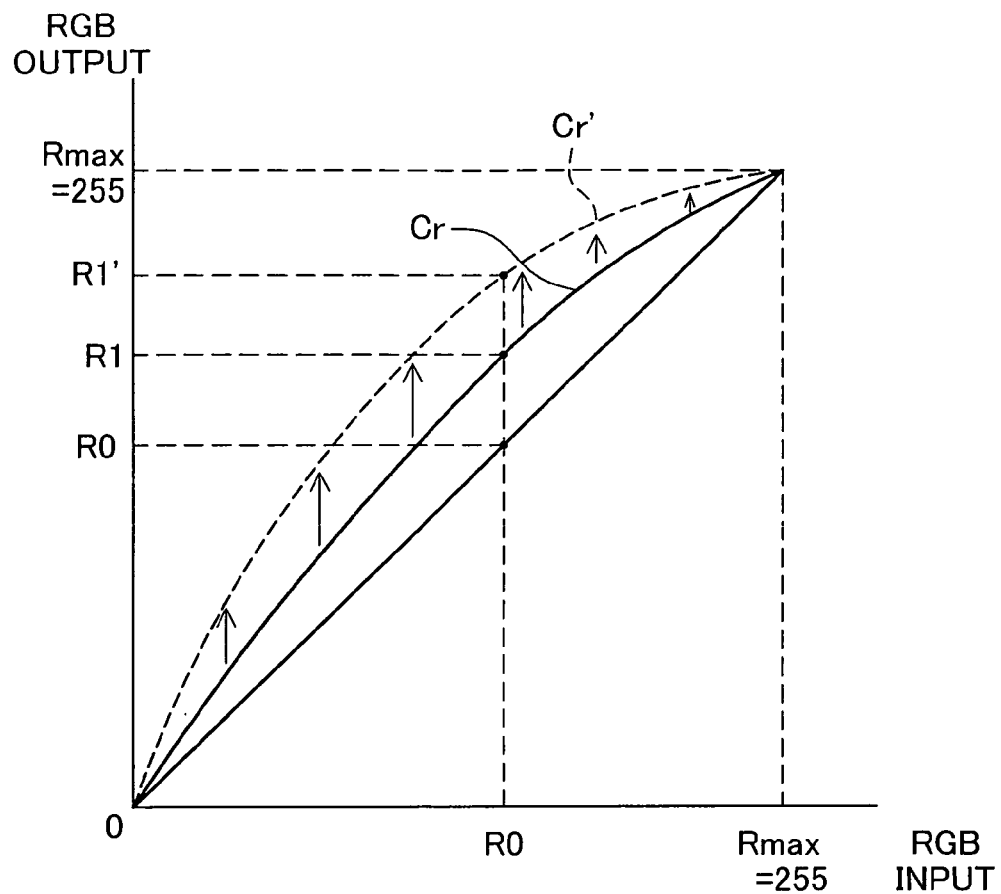
FIG. 7 is a graph showing a red color conversion curve Cr' modified in shape by means of tone value conversion according to lightness conversion curve Cbr.

FIG. 7 is a graph showing a red color conversion curve Cr' which has been modified in shape by means of tone value conversion in accordance with the lightness conversion curve Cbr. The red color conversion curve Cr prior to modification is shown by a solid line, and the modified red color conversion curve Cr' is shown by a broken line. Once the lightness conversion curve Cbr shown in FIG. 6 has been determined, the output tone values of the sample points that determine the shape of the red color conversion curve Cr are further converted by means of tone value conversion in accordance with the lightness conversion curve Cbr. For example, where the lightness conversion curve Cbr has a shape like that of Cbr1 in FIG. 6, output tone values of the sample points are converted to larger values. In FIG. 7, output tone value (R1) for input tone value (R0) (see FIG. 5) is converted to a larger value, namely, output tone value R1'.

The color conversion curve, rather than being held in the form of a table, may instead be held in the form of a numerical equation from which output values may be derived when input values are given. In such an embodiment, when converting tone values, tone value conversion may be realized by executing both conversion by means of a color conversion curve equation and conversion by means of a lightness conversion curve. Where such tone value conversion is represented by a single conversion curve, the result is the color conversion curve Cr' of FIG. 7.

When a lightness parameter Lr is specified by the user through the lightness scale 230 (see FIG. 3), the color conversion curve Cr is modified in shape in the manner described above. Similarly, the color conversion curves Cg, Cb are modified by means of the same lightness conversion curve Cbr.

Subsequently when the Preview button 270 is pressed, the printer driver 96 converts the resolution-converted preliminary image data PID according to the color conversion curves Cr, Cg, Cb, and displays it in the sample image display area 220. These processes are the same as in Steps S310-S314 of FIG. 4.

Generation of the color conversion curves Cr, Cg, Cb as the display conversion table 104b in Step S30 and modification of the shapes of the color conversion curves Cr, Cg, Cb in Step S60 is carried out by the display conversion table generating portion 98c, which is a functional portion of the color conversion module 98.

When the color sample image is displayed in Step S60, in Step S70 the user then decides whether the lightness of the color sample image is acceptable. If it is desired to further modify the lightness of the color sample image, the routine goes back to Step S50. If it is desired to again change the tone, the routine goes back to Step S20. Where lightness and tone of the color sample image are deemed acceptable, the routine proceeds to Step S80, and the Print button 290 (see FIG. 3) is pressed to issue a print command.

As described above, in Embodiment 1 of the invention, the lightness of the overall image does not change significantly during application of tone in Steps S20 and S30. Thus, even in the event that adjustment of tone in Step S20 and adjustment of lightness in Step S30 are performed repeatedly, the lightness of the image established previously will not change appreciably due to readjustment of tone. Thus, the user can easily adjust both tone and lightness.

In Step S80, when the Print button 290 pressed to issue a print command, in Step S90 the color conversion module 98 of the printer driver 96 generates image data MID2 on the basis of the location (color) of the specified point Pcc, and transfers this to the halftone module 99. The image data MID2 goes through the halftone module 99 and the sorting module 100 and is converted to print image data FNL which is printed by the printer 22.

Figure 8:
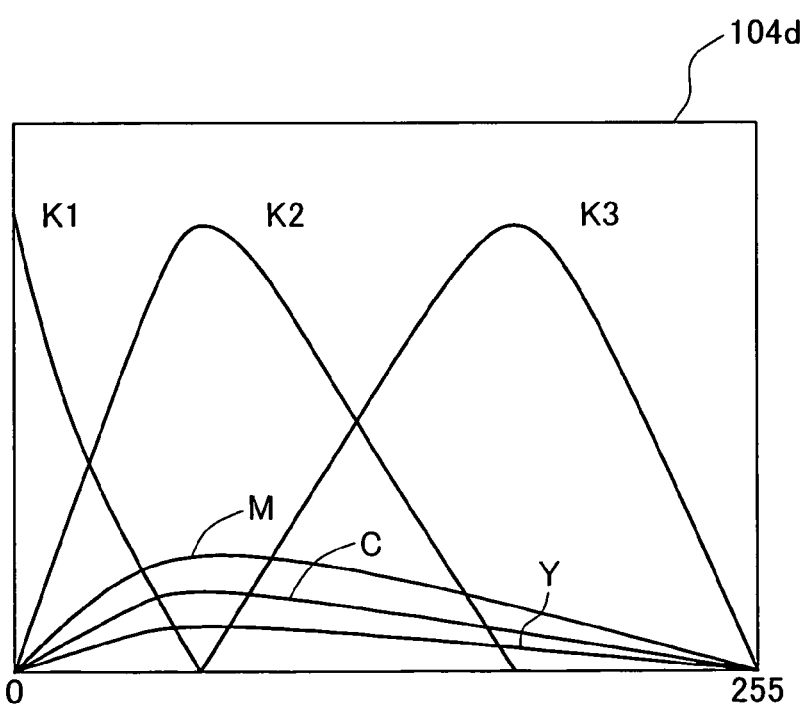
FIG. 8 shows a printing standard one-dimensional lookup table 104d.

FIG. 8 is an illustration showing a printing standard one-dimensional lookup table 104d. The standard printing one-dimensional lookup table 104d is used during printing of a monochrome image without applying tone, for converting gray tone values into tone values of the cyan (C), magenta (M), yellow (Y), and first to third achromatic inks (K1-K3) used by the printer 22. The horizontal axis of the graph of FIG. 8 gives gray tone value, with gray lightness becoming lighter moving to the right on the horizontal axis, and becoming darker moving to the left. The vertical axis of FIG. 8 gives C, M, Y and K1-K3 tone values. The printing conversion table generating portion 98d which is a functional portion of the color conversion module 98 generates a printing one-dimensional lookup table 104c on the basis of this standard printing one-dimensional lookup table 104d. The printing one-dimensional lookup table 104c is used during printing a monochrome image while applying tone to it.

Figure 9:
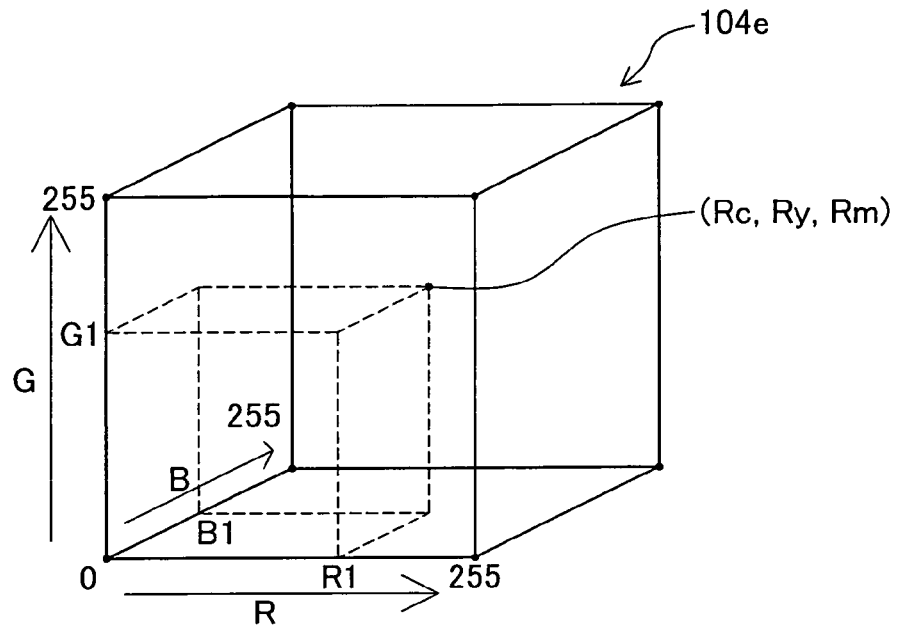
FIG. 9 is a diagram showing a first parameter correspondence table 104e.

FIG. 9 is a diagram showing a first parameter correspondence table 104e. This first parameter correspondence table 104e stores in associated form combinations of sRGB coordinates (R1, G1, B1) that represent the same color as the specified point Pcc, with emphasis coefficients Rc, Rm, Ry for each of the printer ink colors CMY. The emphasis coefficients Rc, Rm, Ry are parameters that specify how to reshape the cyan (C), magenta (M), and yellow (Y) graphs of the first parameter correspondence table 104e (see FIG. 8) in order to apply tone to a monochrome image. Where Rc=Rm=Ry, the first parameter correspondence table 104e is equivalent to the standard printing one-dimensional lookup table 104d.

Figure 10:
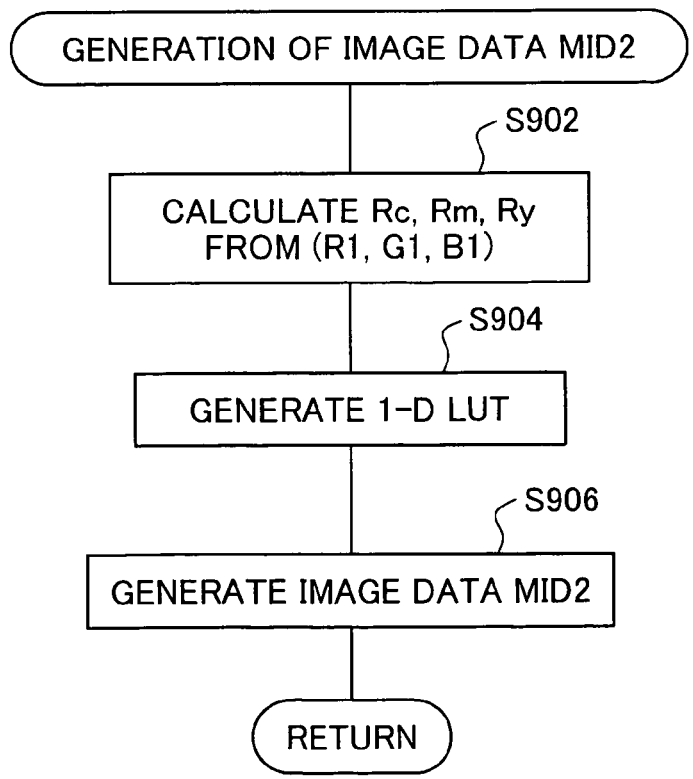
FIG. 10 is a flowchart showing the procedure when generating image data MID2 in Step S90.

FIG. 10 is a flowchart showing the procedure when generating image data MID2 in Step S90. First, in Step S902, the printing conversion table generating portion 98d which is a functional portion of the color conversion module 98 calculates the respective emphasis coefficients Rc, Rm, Ry for CMY, on the basis of the first parameter correspondence table 104e (see FIG. 9) and the color (R1, G1, B1) identified by the specified point Pcc in Step S304 of FIG. 4.

Figure 11:
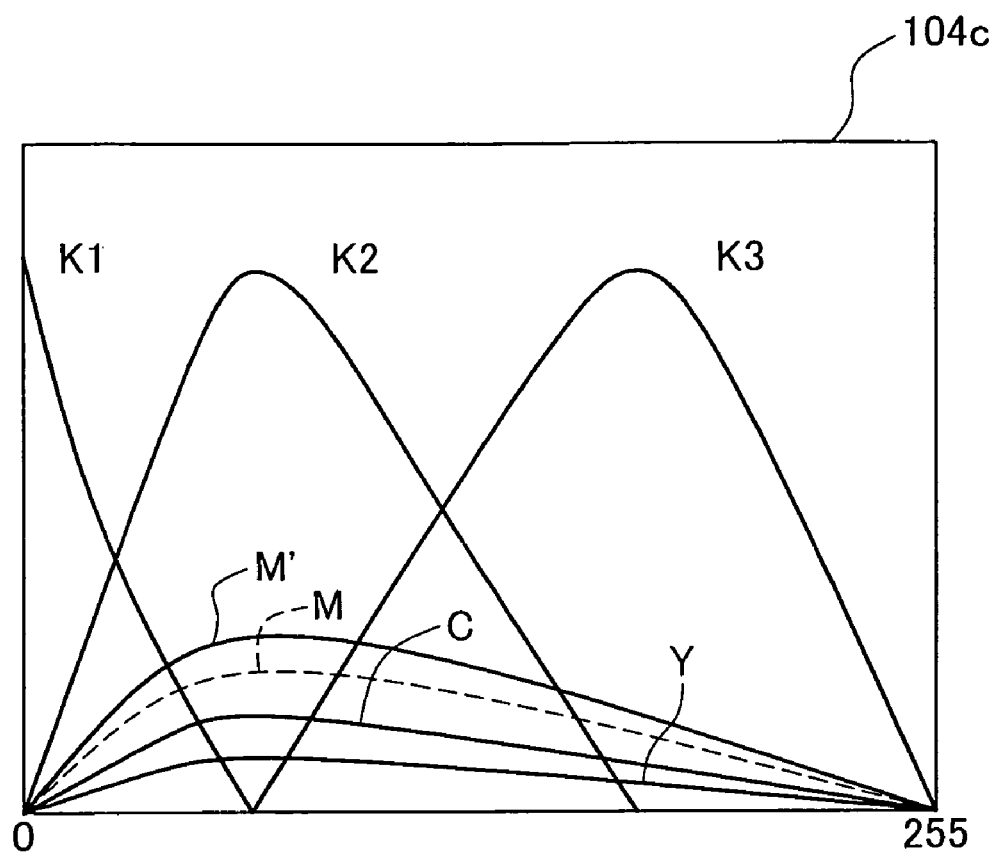
FIG. 11 shows a printing one-dimensional lookup table 104c.

FIG. 11 is an illustration showing the printing one-dimensional lookup table 104c. In Step S904 of FIG. 10, the printing conversion table generating portion 98d multiplies the cyan (C), magenta (M), and yellow (Y) graphs of the standard printing one-dimensional lookup table 104d (see FIG. 8) by the factors Rc, Rm, and Ry respectively, to generate the printing one-dimensional lookup table 104c. In FIG. 11, the magenta (M) graph is shown enlarged by a factor of Rm. The enlarged magenta graph is denoted as M'.

In Step S906 of FIG. 10, on the basis of the printing one-dimensional lookup table 104c generated in the above manner, the color conversion module 98 converts the image data MID1 in which pixel color (lightness) is represented by gray tone values into color image data MID2 represented by tone values of the ink colors C, M, Y, and K1-K3 (see FIG. 1).

In this way, in Embodiment 1, during the process of applying tone and lightness of a monochrome image, it is possible to set parameters while viewing a sample image that reflects the adjustments. It is therefore easy to apply the desired tone and lightness to the monochrome image.

Also, in Embodiment 1, on the basis of a user-specified specified point Pcc, a display conversion table 104 can be generated and a sample image displayed (see S30 of FIG. 2); as well as being able to generate a printing one-dimensional lookup table 104c and generate image data MID2 for printing (see S90 of FIG. 2).

B. Embodiment 2

Figure 12:
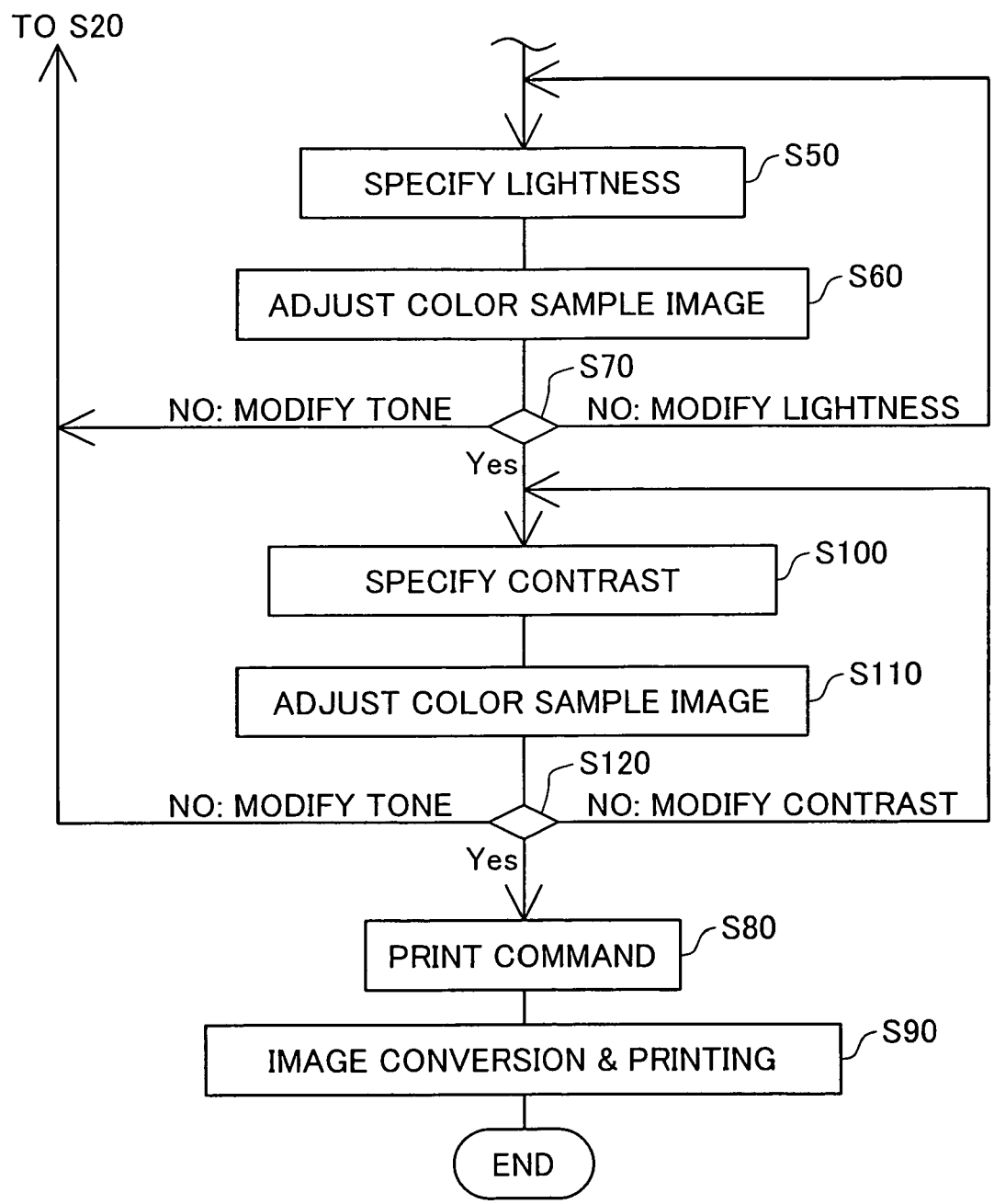
FIG. 12 is a flowchart showing the procedure of Embodiment 2.

FIG. 12 is a flowchart showing the procedure of Embodiment 2. In Embodiment 1, tone is specified by specifying a specified point Pcc within the color circle 210 in Step S20 of FIG. 2, and lightness is specified using the lightness scale 230 in Step S50. In Embodiment 2, after specifying lightness in Step S50, contrast adjustment is performed by controlling a contrast scale 240. Other aspects are the same as in Embodiment 1.

In Embodiment 2, if the user decides in Step S70 that the lightness of the color sample image is acceptable, the process proceeds to Step S100. In Step S100, the user specifies a level of contrast adjustment, through the contrast scale 240 (see FIG. 3).

Figure 13:
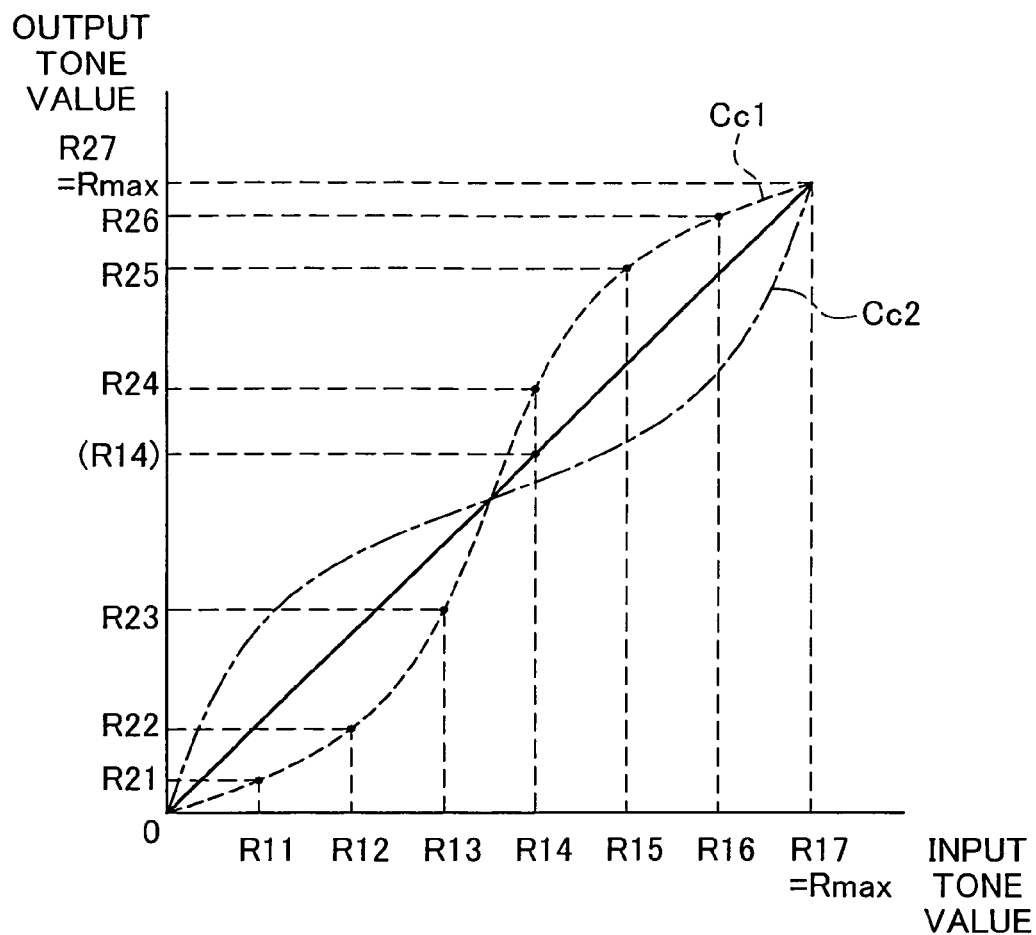
FIG. 13 shows a contrast conversion curves Cc1, Cc2 for red tone values.

FIG. 13 is an illustration showing contrast conversion curves Cc for red tone values. In the contrast conversion process, red tone values for pixels calculated by the process up through Step S50 are converted according to the contrast conversion curves Cc. In FIG. 13, two curves Cc1 and Cc2 are shown by way of examples of the contrast conversion curves Cc. As the contrast parameter that is set through the contrast scale 240 and that specifies the level of contrast adjustment, there could be employed, for example, the slope of the contrast conversion curve in an area in proximity to the median of the tone values prior to conversion (for example, the area of input values R13-R14 in FIG. 13). In Step S110, the printer driver 96 generates the contrast conversion curve Cc with reference to the contrast parameter specified from the contrast scale 240.

For example, where the pointer of the contrast scale 240 has been moved to the High end to the right of center, there will be generated a contrast conversion curve like that show by contrast conversion curve Cc1, wherein the slope of the curve in proximity to the median of input tone values is positive to a greater degree. Where on the other hand the pointer of the contrast scale 240 has been moved to the Low end to the left of center, there will be generated a contrast conversion curve like that show by contrast conversion curve Cc2, wherein the slope of the curve in proximity to the median of input tone values is negative to a greater degree. Where the pointer of the contrast scale 240 is positioned at center, the contrast curve will be a straight line connecting (0, 0) and (Rmax, Rmax) in FIG. 13.

With tone value conversion carried out by means of the contrast conversion curve Cc1, a tone value of 0 prior to conversion will be a tone value of 0 after contrast conversion as well. When the tone value prior to conversion is the maximum value Rmax, the tone value after contrast conversion will be Rmax as well. Tone value conversion by means of the contrast conversion curve Cc1 is carried out such that, for tone values in proximity to the median, the difference between tone values will be greater than that prior to conversion, as will be apparent from the intervals between the input tone values R13 and R14, and between the output values R23 and R24. Tone value conversion is also carried out such that, for tone values in the large tone value area prior to conversion and tone values in the small tone value area prior to conversion, the difference between tone values will be smaller, as will be apparent from the intervals between the input tone values R16 and R17 and the output values R26 and R27, and the intervals between the input tone values R11 and R12 and the output values R21 and R22. By performing conversion of tone values in this way, image contrast is enhanced.

With tone value conversion by means of the contrast conversion curve Cc2, on the other hand, tone value conversion is carried out such that tone value difference will be smaller for tone values in proximity to median input tone value, whereas for tone values in the large tone value area prior to conversion and tone values in the small tone value area prior to conversion, the difference between tone values will be greater. By carrying out tone value conversion in this way, image contrast is decreased.

Specifically, the output tone values of the display conversion table 104b representing the color conversion curves Cr, Cg, Cb of FIG. 5 are converted by means of the contrast conversion curves of FIG. 13, and again stored as output tone values in the display conversion table 104b. The conversion procedure is the same as the shape modification of the color conversion curves Cr, Cg, Cb by the lightness conversion curve Cbr in Embodiment 1.

Subsequently, when the Preview button 270 is pressed, the printer driver 96 converts the resolution-converted preliminary image data PID in accordance with the color conversion curves Cr, Cg, Cb whose output tone values have now been modified, and displays the image in the sample image display area 220. The above process is the process of Step S110 of FIG. 12.

When a color sample image is displayed in Step S110, the user in Step S120 decides whether the contrast of the color sample image is acceptable. In the event that it is desired to further modify contrast from the contrast of the color sample image, the routine returns to Step S100. In the event that it is desired to again modify tone, the routine returns to Step S20. While not shown in the flowchart, in the event that it is desired to modify lightness, the routine returns to Step S50. In the event that the contrast, lightness, and tone of the color sample image are all acceptable, the routine proceeds to Step S80, and the Print button 290 (see FIG. 3) is pressed to issue a print command. In this embodiment, the contrast parameter specifies contrast of a monochrome image, and is reflected in the tone parameter.

In Embodiment 2, the user can perform contrast adjustment while viewing a sample image. Thus, the user can easily apply the desired tone, lightness, and contrast to a monochrome image.

C. Embodiment 3

Embodiment 3 differs from Embodiment 1 in terms of the arrangement of the color circle in the tone setting screen 200

(see FIG. 3) and the method for adding a color tone (see FIG. 4). Other aspects are the same as Embodiment 1.

Figure 14:
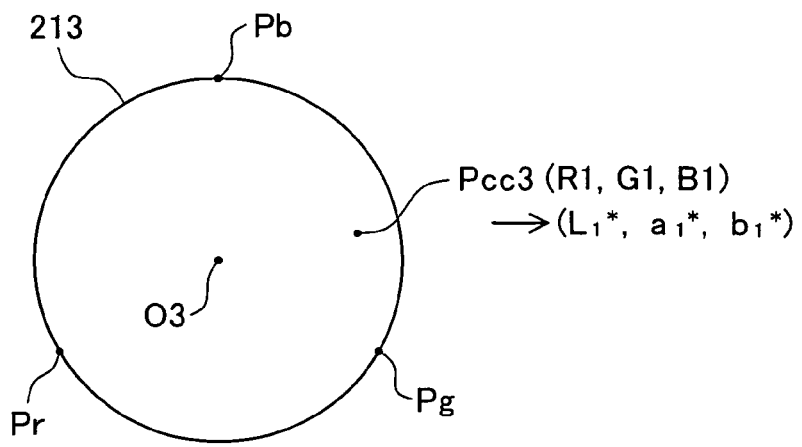
FIG. 14 shows the color circle 213 of Embodiment 3.

FIG. 14 is an illustration showing the color circle 213 of Embodiment 3. In Embodiment 3, the color circle 213 is a disk having a gray point at the center, with at least one hue selected from red, green, and blue differing stepwise depending on location within the color circle 213. Of the colors that change stepwise, the outer peripheral portion of the color circle 213 of Embodiment 3 contains the colors of a hue circle. This color circle 213 has, for example, a point Pb at which red=0, blue=100%, and green=0 at the 12-o'clock position on the circumference of the circle, a point Pg at which red=0, blue=0, and green=100% at the 4-o'clock position on the circumference of the circle, and a point Pr at which red=100%, blue=0, and green=0 at the 8-o'clock position on the circumference of the circle. The center point O3 is a gray point at which red=33%, blue=33%, and green=33%.

Figure 15:
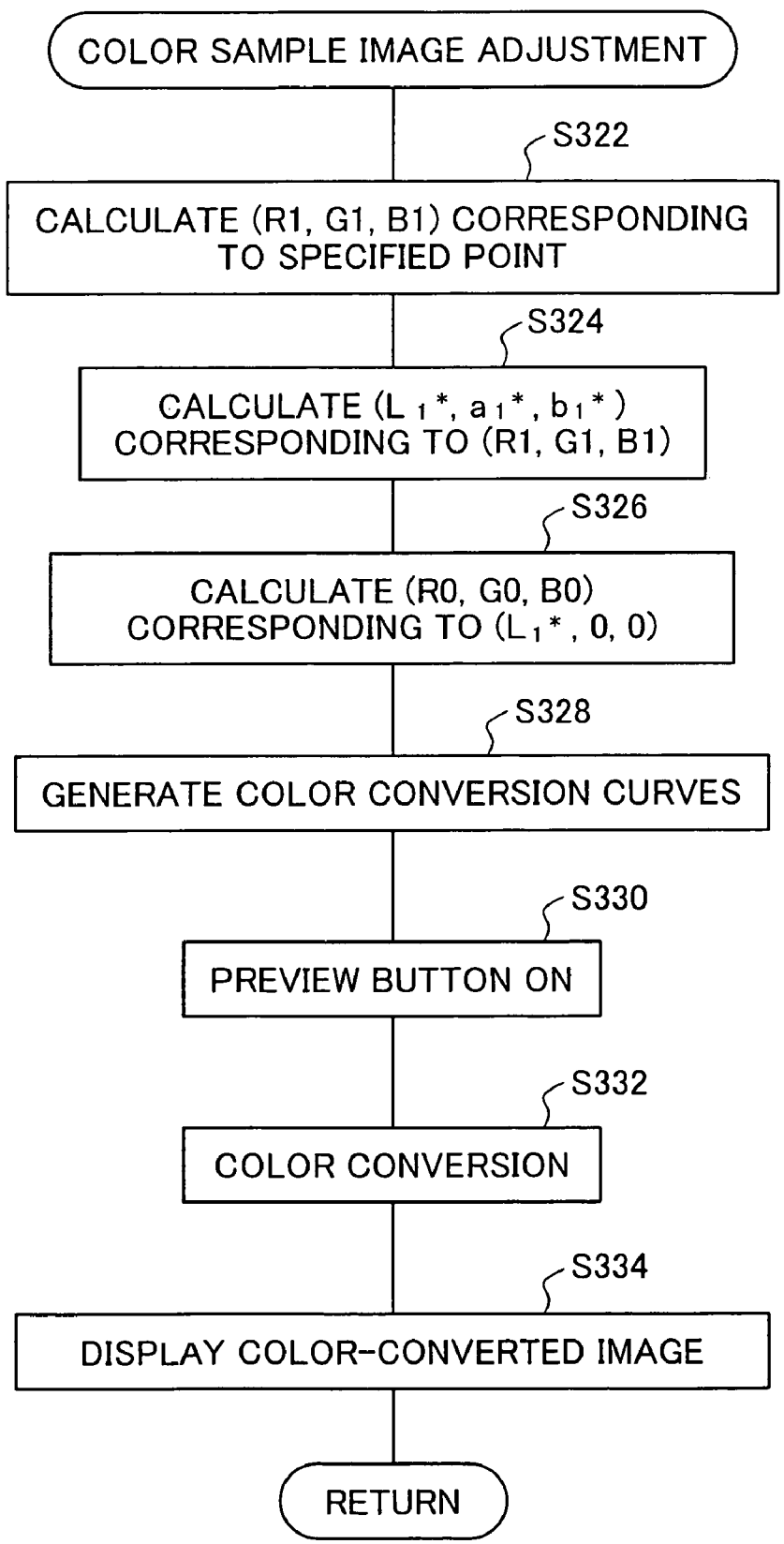
FIG. 15 is a flowchart showing the procedure when adjusting a color sample image in Embodiment 3.

FIG. 15 is a flowchart showing the procedure when adjusting a color sample image in Embodiment 3. In the same way as in Embodiment 1, when applying tone to a monochrome image, the user specifies a specified point Pcc3 within the color circle 213 (see S20 of FIG. 2). Once a specified point Pcc3 has been specified, the printer driver 96 in Step S322 calculates sRGB color system coordinates (R1, G1, B1) representing the same color as the color of the specified point Pcc3 in the color circle 213. Then, in Step S324, L*a*b* color system coordinates ($L_1^*$, $a_1^*$, $b_1^*$) representing the same color as the coordinates (R1, G1, B1) are calculated.

In Step S326, the printer driver 96 calculates sRGB color system coordinates (R0, G0, B0) representing the same color for gray having the same lightness as the specified point Pcc3, i.e., color for which the L*a*b* color system coordinates are ($L_1^*$, 0, 0). In this way, in accordance with user-input parameters, there are calculated sRGB system coordinates (R1, G1, B1) representing the same color as the color of the specified point Pcc3, and sRGB color system coordinates (R0, G0, B0) representing gray having the same lightness as the specified point Pcc3. These calculations are performed by the hue determining portion 98b (see FIG. 1) which is a functional portion of the color conversion module 98.

Subsequently, in Step S328, there are generated a quadratic color conversion curve Cr for converting a red tone value of R0 to R1, a quadratic color conversion curve Cg for converting a green tone value of G0 to G1, and a quadratic color conversion curve Cb for converting a blue tone value of B0 to B1 (see FIG. 5). The procedure for generating the color conversion curves Cr, Cg, Cb is the same as in Step S308 of FIG. 4. The procedure of Steps S330, S332, and S334 of FIG. 15 hereinbelow is the same as the procedure of Steps S310, S312, and S314 of FIG. 4. In Embodiment 3, the display conversion table 104b is generated in the above manner. The printing one-dimensional lookup table 104c is generated in the same manner as in Embodiment 1.

In this embodiment as well, a user can easily set the hue to be applied to a monochrome image, while viewing a sample image. In Embodiment 3, the color circle 213 need not necessarily display color of given lightness. However, in Embodiment 3, hue is applied in such as way as to convert gray having the same lightness as the specified point Pcc3, rather than the gray of the center point of the color circle 213, to the color of the specified point Pcc3. Thus, when applying tone, there is no appreciable change in lightness of an image.

In Embodiment 3, the lightness $L_1^*$ of the specified point Pcc3 is the "fixed lightness" described above.

D. Embodiment 4

The software of the printing system of Embodiment 4 comprises, instead of the first parameter correspondence table 104e (see FIG. 1 and FIG. 9), a second parameter correspondence table 104f. In Embodiment 4, the arrangement of the color circle (see FIG. 3), the method for determining hue for application to a monochrome image, and the method for generating image data MID2 from image data MID1 are different from those in Embodiment 1. Other aspects are the same as Embodiment 1. Accordingly, the procedure when determining hue to be applied to a monochrome image, adjusting a color sample image, and generating image data MID2 is described hereinbelow.

Figure 16:
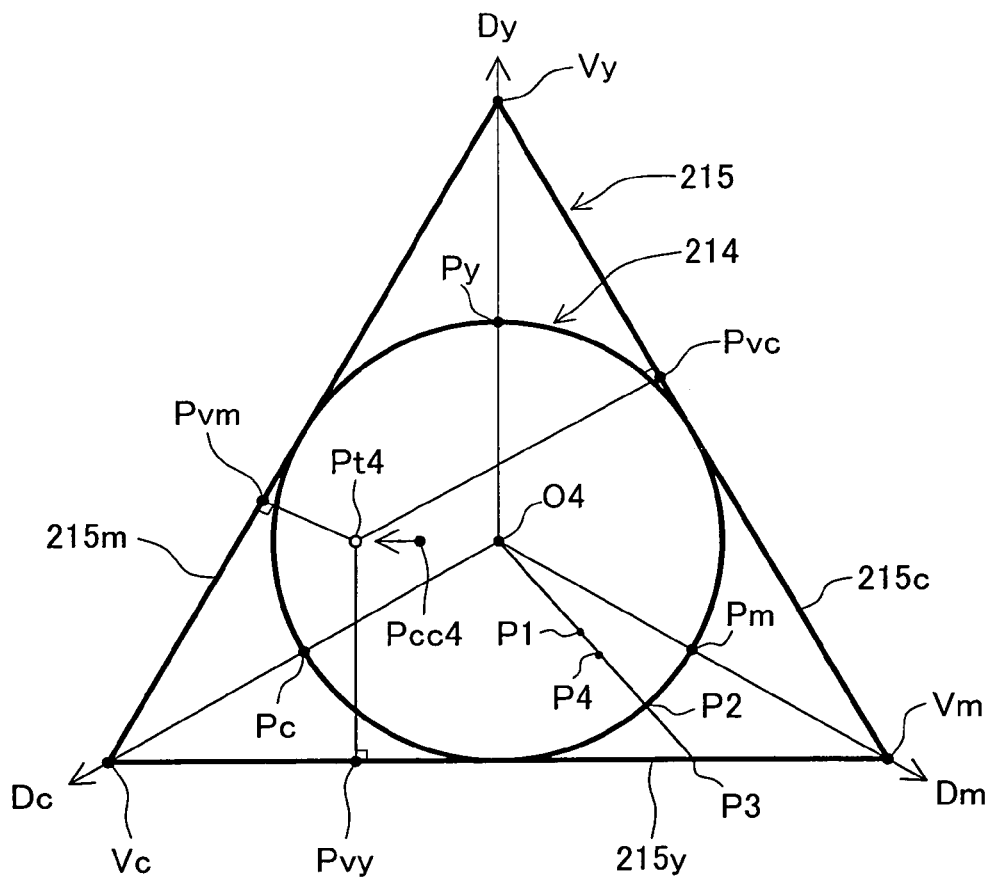
FIG. 16 shows the relationship of a color circle 214 and a CMY color triangle 215 in Embodiment 4.

FIG. 16 is an illustration showing the relationship of a color circle 214 and a CMY color triangle 215 in Embodiment 4. In Embodiment 4, the color circle is a disk having a gray point at its center, with at least one hue selected from cyan, magenta, and yellow differing stepwise depending on location within the color circle. The outside peripheral portions of the color circle of Embodiment 4 also have the colors of a hue circle at respective predetermined locations. This color circle has, for example, a point Py at which cyan=0, yellow=100%, and magenta=0 at the 12-o'clock position on the circumference of the circle, a point Pm at which cyan=0, yellow=0, and magenta=100% at the 4-o'clock position on the circumference of the circle, and a point Pc at which cyan=100%, yellow=0, and magenta=0 at the 8-o'clock position on the circumference of the circle. The center point O4 is a gray point at which cyan=33%, yellow=33%, and magenta=33%.

Any point within the color circle 214 is mapped to a corresponding point in the CMY color triangle 215, which is a hypothetical triangle corresponding to the color circle 214. The CMY color triangle 215 is an equilateral triangle having a center point O4 in common with the color circle 214. Specifically, the center point O4 of the color circle 214 corresponds to the center point O4 of the CMY color triangle 215. A point Pc on the circumference of the color circle 214 corresponds to one of the vertices Vc of the CMY color triangle 215. Similarly, points Pm, Py on the circumference of the color circle 214 correspond to the other vertices Vm, Vy of the CMY color triangle 215.

Let an arbitrary point in the color circle 214 be designated as P1, a point on a line connecting point P1 and the center point O4 and intersecting the circumference of the color circle 214 on the point P1 side be designated as P2, and a point on an extension thereof and intersecting a side of the CMY color triangle 215 be designated as P3. Here, the point P4 in the CMY color triangle 215 corresponding to the point P1 within the color circle 214 is a point situated on a line connecting point P1 and the center point O4, and on the opposite side of point P1 from the center point O4. Point P4 also meets the condition given below. L1-L4 denote the respective distances from the center point O4 to points P1-P4.

$$L1/L4 = L2/L3 \tag{1}$$

In Embodiment 4, the tone applied to a monochrome image is specified by a CMY emphasis coefficients that are determined on the basis of a specified point Pcc4 specified within the color circle 214. The cyan (C), magenta (M), and yellow (Y) graphs of the standard printing one-dimensional lookup table 104d are then modified on the basis of CMY emphasis coefficients Rc, Rm, Ry that have been determined on the basis of the specified point Pcc4, to generate a printing one-dimensional lookup table 104c.

First, parameters Ic, Im, Iy for CMY are calculated respectively with the equations given below. In the equations below, Qc is the length of a perpendicular line drawn from point Pt4 corresponding to the specified point Pcc4, to the side 215c facing vertex Vc; Qm is the length of a perpendicular line drawn from point Pt4 to the side 215m facing vertex Vm; and Qy is the length of a perpendicular line drawn from point Pt4 to the side 215y facing vertex Vy. In FIG. 16, the foot of the perpendicular line drawn from point Pt4 to side 215c is designated as Pvc, the foot of the perpendicular line drawn from point Pt4 to side 215m is designated as Pvm, and the foot of the perpendicular line drawn from point Pt4 to side 215y is designated as Pvy.

$$Ic = Qc/(Qc + Qm + Qy) \quad (2)$$

$$Im = Qm/(Qc + Qm + Qy) \quad (3)$$

$$Iy = Qy/(Qc + Qm + Qy) \quad (4)$$

Since sum of the perpendicular lines (Qc+Qm+Qy) is always constant, (Ic+Im+Iy) is always equal to 1. Ic, Im, and Iy each assume values from 0 to 1.

Figure 17:
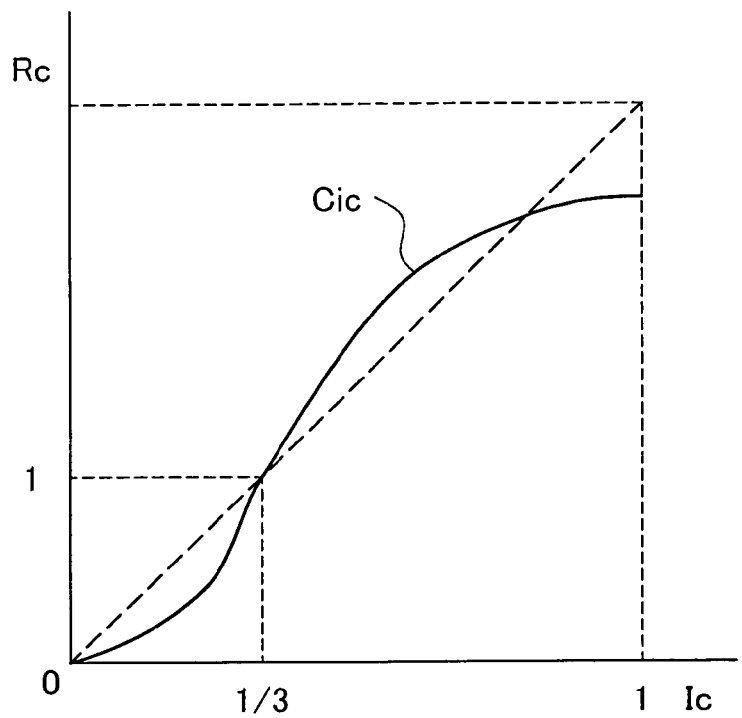
FIG. 17 shows a Conversion curve Cic for determining the cyan emphasis coefficient Rc from the cyan parameter Ic.

FIG. 17 is a conversion curve for Cic determining the cyan emphasis coefficient Rc from the cyan parameter Ic. As will be understood from FIG. 17, the relationship between the emphasis coefficient Rc and the parameter Ic is not linear. However, the conversion curve for Cic is established such that when Ic is ⅓, the emphasis coefficient Rc is 1. While not shown in the drawing, a conversion curve for determining the magenta emphasis coefficient Rm from the magenta parameter Im, and a conversion curve for determining the yellow emphasis coefficient Ry from the yellow parameter Iy, are determined in similar manner.

When the specified point Pcc4 coincides with the center point O4, Qc, Qm, and Qy are equal to one another, and from Equations (2)-(4), the parameters Ic, Im, and Iy assume equal values to one another. At this time, Ic=Im=Iy=⅓. Also, at this time, on the basis of the conversion curve, the cyan, magenta, and yellow emphasis coefficients Rc=Rm=Ry=1 (see FIG. 17).

The printing conversion table generating portion 98d which is a functional portion of the color conversion module 98 multiplies the cyan (C), magenta (M), and yellow (Y) graphs of the standard printing one-dimensional lookup table 104d (see FIG. 6) by the factors Rc, Rm, and Ry respectively, to generate the printing one-dimensional lookup table 104c (see FIG. 11).

On the basis of the printing one-dimensional lookup table 104c generated in this way, the color conversion module 98 converts the image data MID1 in which pixel color (lightness) is represented by gray tone values into color image data MID2 represented by tone values of the ink colors C, M, Y, and K1-K3 (see FIG. 1). In Embodiment 4, generation of color image data MID2 represented by ink color tone values is generated in the above manner.

In Embodiment 4, adjustment of the color sample image in the tone setting screen 200 (see FIG. 3) of the printer driver is carried out as follows.

Figure 18:
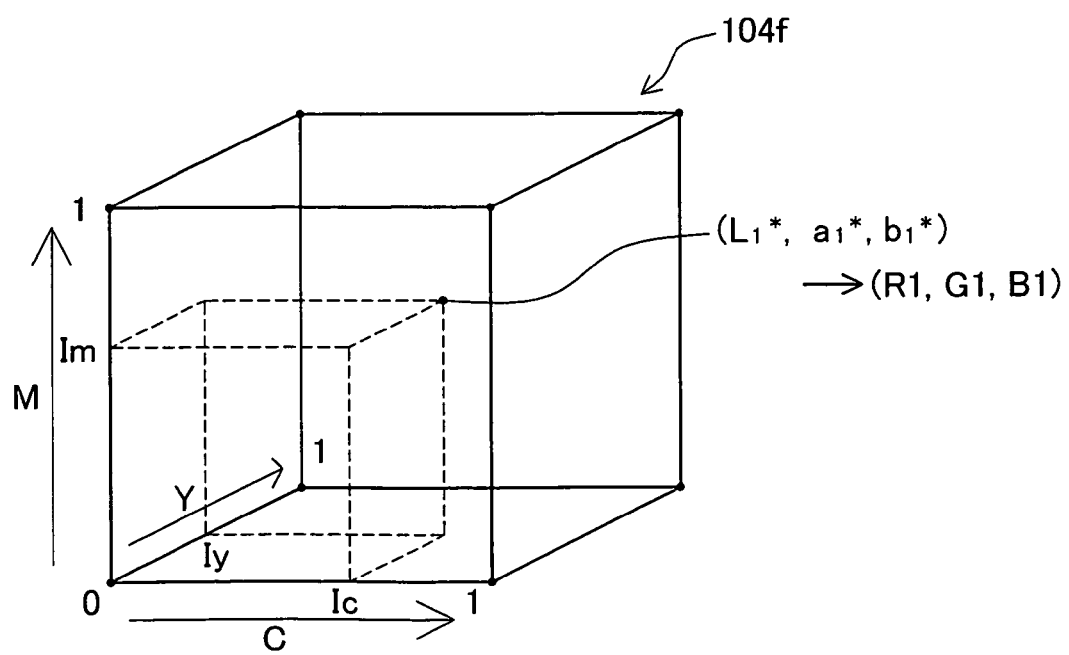
FIG. 18 represents a second parameter correspondence table 104f.

FIG. 18 is an illustration representing the second parameter correspondence table 104f. The second parameter correspondence table 104f (not shown in FIG. 1) stores, in associated form, combinations of parameters Ic, Im, Iy for CMY derived respectively by Equations (2)-(4), and tone values of colors represented in the L*a*b* color system. More specifically, the second parameter correspondence table 104f stores the color into which gray having a tone value of 100 is converted, as the tone value ($L_1^*$, $a_1^*$, $b_1^*$) of a color represented in the L*a*b* color system, when application of tone, which is specified by means of the parameters Ic, Im, Iy respectively assuming values, has been carried out.

Here, in preferred practice, $L_1^*$ stored in the second parameter correspondence table 104f will be 30-70, more preferably 40-60, and still more preferably 45-55.

Figure 19:
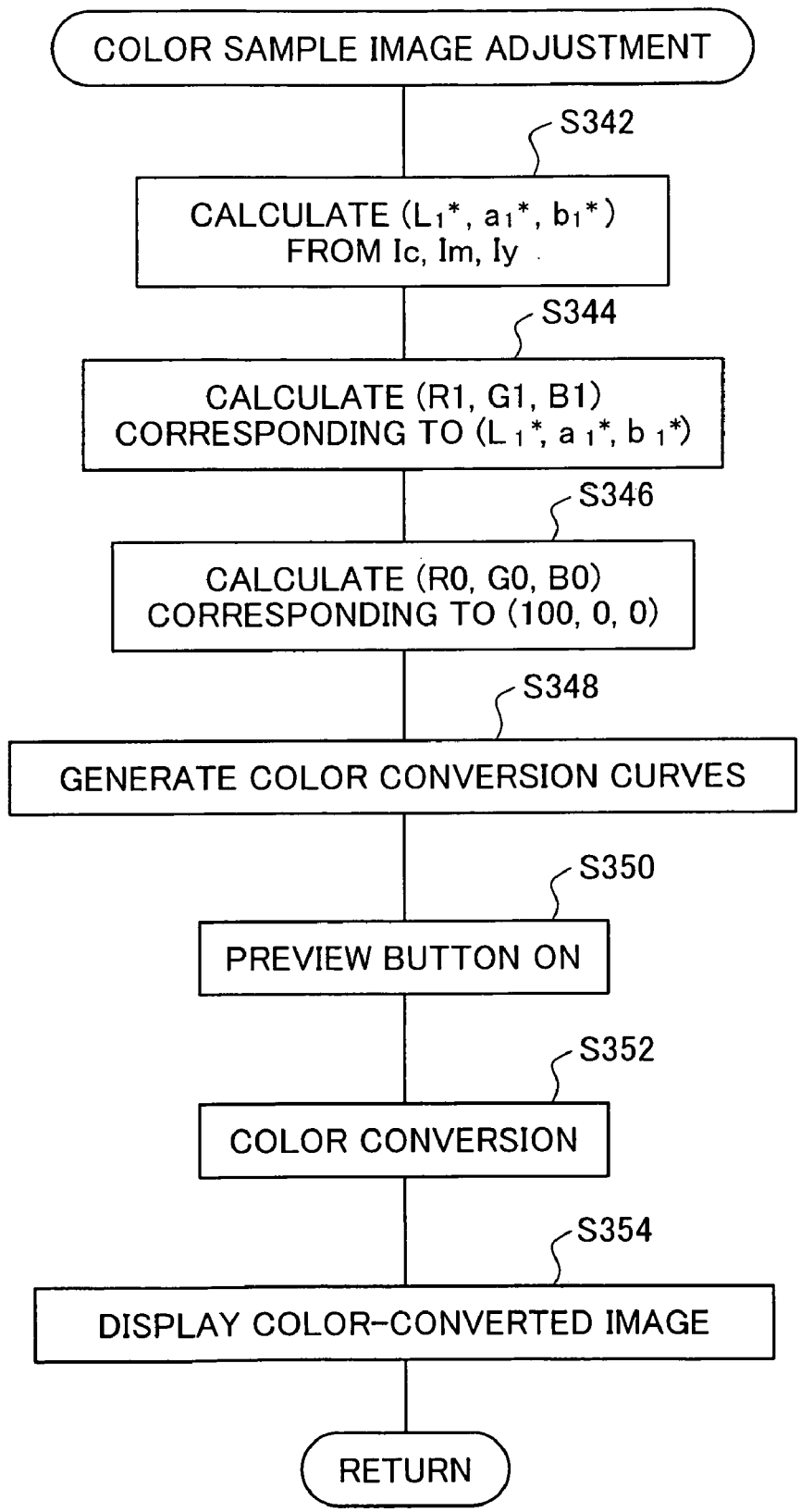
FIG. 19 is a flowchart of the procedure when adjusting a color sample image in Embodiment 4.

FIG. 19 is a flowchart of the procedure when adjusting a color sample image in Embodiment 4. When parameters Ic, Im, Iy are derived by Equations (2)-(4), the tone determining portion 98b, in Step S342, first refers to the second parameter correspondence table 104f. The tone determining portion 98b calculates, as the tone value ($L_1^*$, $a_1^*$, $b_1^*$) in the L*a*b* color system, which color gray having a tone value of 100 would be converted to by applying the tone specified by the parameters Ic, Im, Iy. The tone determining portion 98b is a functional portion of the color conversion module 98. The L*a*b* color system tone value ($L_1^*$, $a_1^*$, $b_1^*$) derived by making reference to the second parameter correspondence table 104f is then converted in Step S344 to an sRGB system tone value (R1, G1, B1).

When $L_1^*$ is 40, R1, G1, B1 is approximately 80. When $L_1^*$ is 60, R1, G1, B1 is approximately 130. When $L_1^*$ and the resultant R1, G1, B1 assume such values, tone can be applied without making differences in tone in dark areas of the image extremely small, or making differences in tone in light areas of the image extremely small.

In Step S346, the tone determining portion 98b calculates the sRGB color system tone value (R0, G0, B0) for gray having lightness of 100 represented by (100, 0, 0) in the L*a*b* color system. Application of the tone specified by parameters Ic, Im, Iy converts color represented by (R0, G0, B0) (i.e. gray) to color represented by (R1, G1, B1). R1, G1, B1 are the "tone parameters".

In Step S348, the tone determining portion 98b generates a quadratic color conversion curve Cr for converting a red tone value of R0 to R1, a quadratic color conversion curve Cg for converting a green tone value of G0 to G1, and a quadratic color conversion curve Cb for converting a blue tone value of B0 to B1 (see FIG. 5). The procedure for generating the color conversion curves Cr, Cg, Cb is the same as in Step S308 of FIG. 4. The procedure of Steps S350, S352, and S354 of FIG. 15 hereinbelow is the same as the procedure of Steps S310, S312, and S314 of FIG. 4.

In this embodiment as well, a user can easily set the hue to be applied to a monochrome image, while viewing a color sample image. In Embodiment 4, since the color sample image has applied thereto a tone based on Ic, Im, Iy which specify tone application to image data for printing, there can be displayed a sample image that is more faithful to the printed image.

E. Eembodiment 5

Figure 20:
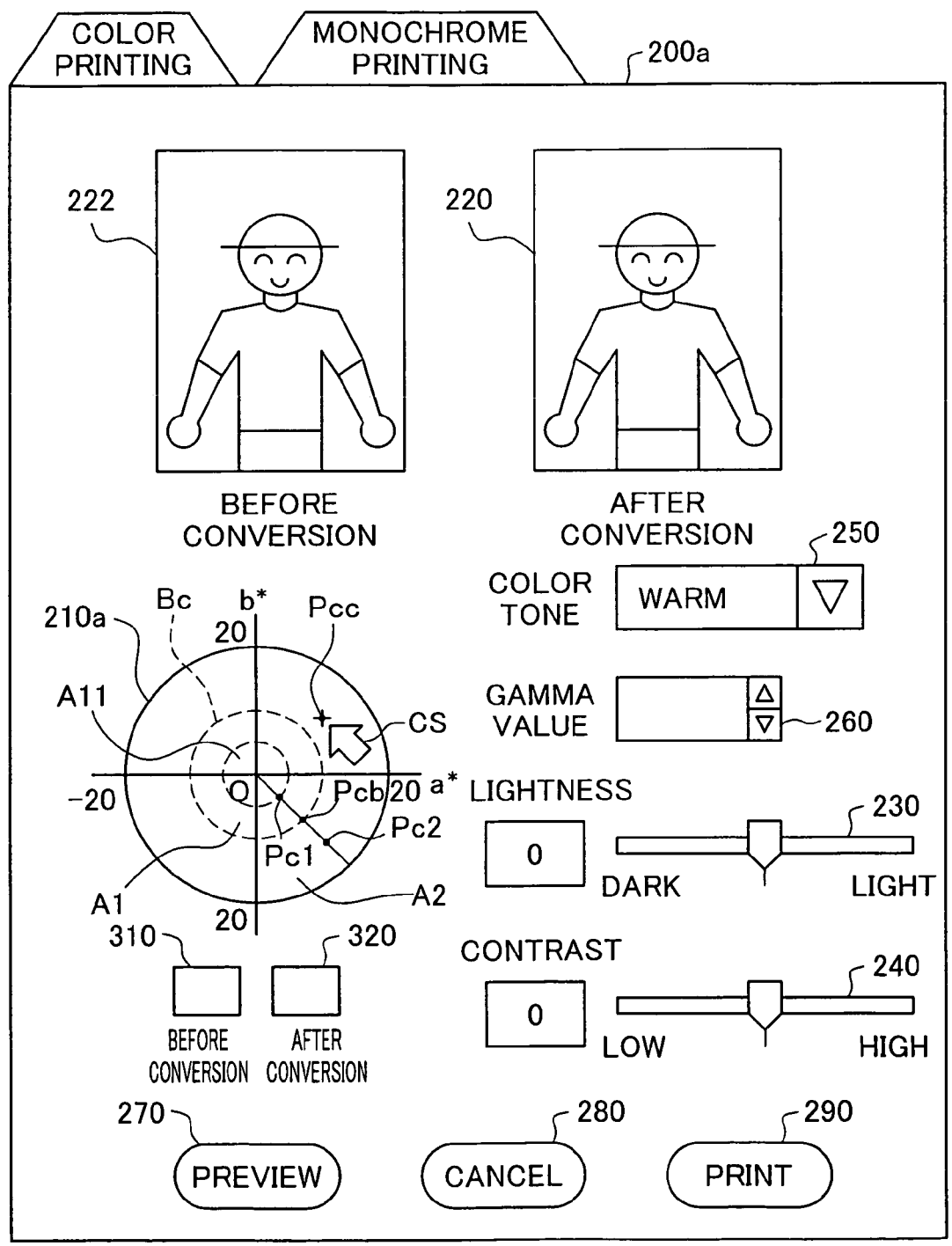
FIG. 20 shows the tone setting screen 200a of the printer driver 96 of Embodiment 5.

E1. Overview:

FIG. 20 is an illustration showing the tone setting screen 200a of the printer driver 96 in Embodiment 5. The tone setting screen 200a has, in addition to the features of the tone setting screen 200 of FIG. 3, a reference image display area 222 for displaying color sample images prepared in advance (hereinafter "reference images"), a gray patch 310 displaying the color of the center point O of a color circle 210a, and a color patch 320 for displaying the color of a specified point Pcc within the color circle 210a.

In Embodiment 5, the arrangement of the color circle 210a is different from that of Embodiment 1. The first parameter correspondence table 104e and the printing one-dimensional lookup table 104c are arranged so as to meet specific conditions. In other respects, the printer driver 96 and the tone setting screen 200a of Embodiment 5 are the same as the printer driver 96 and the tone setting screen 200 of Embodiment 1.

E2. Color Circle:

In the color circle 210 of Embodiment 1, colors represented by points coincide with locations of the points on the color circle 210, which represents an a*b* plane. As a result, there is a proportional relationship between the saturation Cv of display colors of points, and their distance D from the center point O. In Embodiment 5, however, colors represented by points within the color circle 210a do not coincide with locations of the points within the color circle 210a. As a result, the saturation Cv of display colors of points is non-linear with respect to the distance D of points from the center point O.

However, the saturation Cv of display colors of points increases monotonically with respect to the distance D of points from the center point O. Specifically, saturation is lower the closer a point is to the center point O. The change in saturation Cv of display colors of points with respect to the distance D of points from the center point O is equivalent in each direction, with the center point O as the center. Display colors of points within the color circle 210a are colors for which lightness L*=55.

Figure 21:
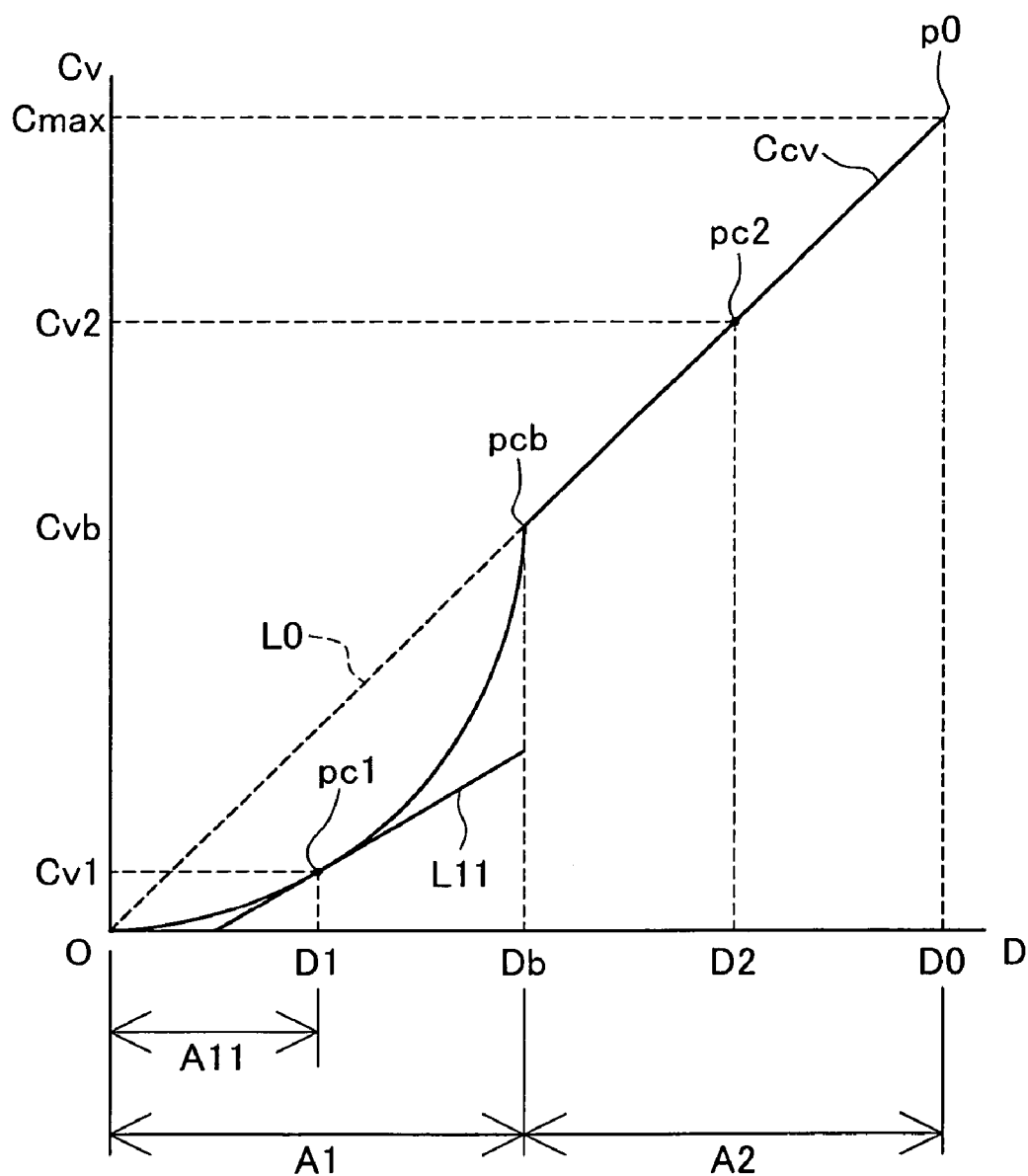
FIG. 21 is a graph showing saturation Cv of display color of points included in the color circle 210a shown in FIG. 20, and located on a line passing through center point O and points P1, P2.

FIG. 21 is a graph showing display color saturation Cv of points contained in the color circle 210a, which points are located along a straight line passing through the center point O, and points Pc1, Pc2 (see FIG. 20). The horizontal axis plots distance of the point from the center point O. When the radius of the color circle 210a is D0, the distance D1 of point Pc1 from the center point O is D0×¼. The distance D2 of point Pc2 from the center point O is D0×¾. In FIG. 21, the point corresponding to point Pc1 is indicated by pc1, and the point corresponding to point Pc2 is indicated by pc2.

Within the color circle 210a, a circle having the center point O as its center and radius Db=Do/2 is denoted as circle Bc. The area inside the color circle 210a and inside the circle Bc is denoted as area A1. The area inside the color circle 210a but outside circle Bc is denoted as area A2. As shown in FIG. 20, point Pc1 lies inside area A1, and point Pc2 lies inside area A2. A point situated on the same straight line as points Pc1, Pc2 and lying on circle Bc is designated as Pcb. In FIG. 21, the point corresponding to point Pcb is designated as pcb.

In area A1 inside circle Bc, as shown in FIG. 21, the line Ccv representing saturation of display colors of points with respect to distance of points from the center point O is a downwardly bowing quadratic curve. In area A2 outside circle Bc, the line Ccv representing saturation of display colors of points is a straight line. This straight line portion overlaps the straight line L0 passing through point O and point p0 (D0, Cvmax) in FIG. 21. Here, Cvmax is the maximum value of saturation within the color circle 210a.

Where the slope of the line L0 is designated as a constant c, saturation Cvs determined by the line L0 is represented by the following equation.

$$Cvs = c \times D \qquad (5)$$

As will be understood from FIG. 21, in area A1, with the exception of point O and point Pcb, saturation Cv1 of points is lower than saturation as determined by the line L0. That is, saturation Cv1 of points in area A1 fulfills the following equation.

$$Cv1 < c \times D \qquad (6)$$

For area A2, on the other hand, saturation Cv2 of points is equal to saturation as determined by the line L0. That is, saturation Cv2 of points in area A2 fulfills the following equation.

$$Cv2 = c \times D \qquad (7)$$

Point of the color circle 210a have display color saturation as described above.

In FIG. 21, a tangent of curve Ccv at point p1 is indicated by L11. As will be understood from FIG. 21, the slope of line L11 is smaller than the slope of line L0. Within area A1, on the other hand, the curve representing saturation is a downwardly bowing quadratic curve. Thus, within area A11, the slope of the tangent at points on curve Ccv is smaller than the slope of the tangent at point pc1.

The slope of line L0 at points within area A2 is equivalent to the increase in saturation Cv with respect to increase in distance D from center point O. The slope of a tangent of curve Ccv within area A11 is equivalent to the increase in saturation Cv with respect to increase in distance D from center point O, at the corresponding point. Thus, the increase in saturation Cv with respect to increase in distance D from center point O within area A11 is smaller than the increase in saturation Cv with respect to increase in distance D from center point O within area A2.

The human visual sense is more sensitive to changes in saturation in areas of low saturation than it is to changes in saturation in areas of high saturation. In this embodiment, the increase in display color saturation with respect to increase in distance from the center point O is smaller in areas of low saturation than in areas of high saturation in the above manner. According to such an embodiment, change in display color at points within the color circle 210a can be made to appear natural to the human eye.

E3. Printing One-Dimensional Lookup Table and First Parameter Correspondence Table:

In Embodiment 5 as well, the first parameter correspondence table 104e (see FIG. 1) stores in associated form combinations of sRGB coordinates (R1, G1, B1) that represent the same color as the display color data of the specified point Pcc, with emphasis coefficients Rc, Rm, Ry for each of the printer ink colors CMY. However, the first parameter correspondence table 104e of Embodiment 5 is designed to meet the conditions mentioned hereinbelow.

In Embodiment 5, the display conversion table 104b is formed by the same procedure as in Embodiment 1. Thus, according to the display conversion table 104b, the gray of the center point O of the color circle 210a is converted to the color identified by the color data belonging to the specified point Pcc.

On the other hand, the printing one-dimensional lookup table 104c in Embodiment 5 is different from that of Embodiment 1. When a tone value for lightness representing the same color as the gray of the center point O of the color circle 210a has been input to the printing one-dimensional lookup table 104c (see FIG. 11), the ink color tone value which is the output value will not represent the color identified by the color data belonging to the specified point Pcc. That is, where printing is executed in accordance with ink color tone values which are output values of the printing one-dimensional lookup table 104c, the color reproduced on the printing paper will be color with lower saturation than color identified by the color data belonging to the specified point Pcc. This is the first condition of the printing one-dimensional lookup table 104c.

In the color circle 210a of Embodiment 5, display color saturation Cv of points increases monotonically with respect to distance D of points from the center point O. Thus, points at the outermost periphery of the color circle 210a display colors having the highest saturation. Of the combinations of input tone values and output tone values of the printing one-dimensional lookup table 104c, a combination that reproduces on the printing paper color corresponding to a point at the outermost periphery of the color circle 210a reproduces color with lower saturation than the display color saturation Cv at that point. This is the second condition of the printing one-dimensional lookup table 104c.

In Embodiment 5, the printing one-dimensional lookup table 104c is designed so as to fulfill the above conditions. The first parameter correspondence table 104e, which stores the emphasis coefficients Rc, Rm, Ry to which reference is made during generation of the printing one-dimensional lookup table 104c, is generated such that the printing one-dimensional lookup table 104c generated thereby fulfills the above conditions.

In preferred practice, the printing one-dimensional lookup table 104c will impart to monochrome tone values overall, tone of lower saturation than the display conversion table 104b. Also, in preferred practice, first parameter correspondence table 104e which stores the emphasis coefficients Rc, Rm, Ry to which reference is made during generation of the printing one-dimensional lookup table 104c will be established such that the printing one-dimensional lookup table 104c generated thereby fulfills such a condition.

The human visual sense is more sensitive to recognizing change in saturation of color reproduced by reflected light of light striking a physical object such as printed matter, than it is to change in saturation of color reproduced by light from a light-emitting object such as a display. Accordingly, the design of the printing one-dimensional lookup table 104c and the first parameter correspondence table 104e in the above-described manner has an advantage. Specifically, it is possible for the user, when applying tone during printing, to achieve applied tone that is perceptually similar to applied tone specified on the display.

Whether the printing one-dimensional lookup table 104c is "a table that converts predetermined color to color having saturation lower than predetermined saturation" can be verified in the following way.

Using the printing one-dimensional lookup table 104c, lightness tone value data representing the same color as the gray of the center point O of the color circle 210a is printed by the printer 22. During this time, the printing medium is printing paper intended for use by the printer 22 and having specified whiteness level for photo printing purposes. The printed result is then measured with a calorimeter, to derive color saturation of the printed result. It is then verified whether the saturation is lower than the saturation of color data associated with the specified point Pcc. If saturation ascertained through this measurement is lower than the saturation of color data associated with the specified point Pcc, it may be said that, "color reproduced on the printing paper is color having lower saturation than the color identified by the color data of the specified point Pcc."

In Embodiment 5, color of color data associated with points of the color circle is equivalent to color displayed at points of the color circle. The emphasis coefficients Rc, Rm, Ry are determined based on such color data referencing the first parameter correspondence table 104e. The printing one-dimensional lookup table 104c is generated based on the emphasis coefficients Rc, Rm, Ry. The printing one-dimensional lookup table 104c meets above mentioned specific conditions because the emphasis coefficients Rc, Rm, Ry stored in the first parameter correspondence table 104e is prepared to serve the purpose.

E4. Procedure for Performing Printing With Specified Tone Applied to Monochrome Image:

Following is a description of the procedure in Embodiment 5 when performing printing with a specified tone being applied to a monochrome image, the description focusing on the differences from Embodiment 1. For procedures other than the procedures mentioned hereinbelow, the printing procedure of Embodiment 5 is the same as that of Embodiment 1.

In Embodiment 5, when the tone setting screen 200a is displayed in Step S20 of FIG. 2, a reference image prepared in advance is displayed in the reference image display area 222. The reference image is a black-and-white image represented by pixel lightness only. The color of the center point O of the color circle 210a is displayed in the gray patch 310 in the tone setting screen 200a.

At this point in time, in the sample image display area 220 situated next to the reference image display area 222 in the tone setting screen 200a, there is displayed the same reference image as in the reference image display area 222. Also, at this point in time, the color patch 320 situated next to the gray patch 310 in the tone setting screen 200a is displayed as a patch of the color of the center point O of the color circle 210a.

When a specified point Pcc has been specified in Step S20 of FIG. 2, the display color of the specified point Pcc, i.e. the color identified by the color data associated with the specified point Pcc, is displayed in the color patch 320 (see FIG. 20). In the neighboring gray patch 310, on the other hand, the color of the center point O of the color circle 210a is displayed. Thus, the user can compare the two patches, to verify the particulars of tone application selected by himself by means of the specified point Pcc. That is, the user can more readily verify the particulars of tone application, as compared to the case where the color of two "points", namely, the center point O of the color circle 210a and the specified point Pcc, must be compared in order to verify.

In Step S30, the reference image is adjusted depending on the location of the specified point Pcc, and displayed in the sample image display area 220. Meanwhile, in the reference image display area 222 there is displayed the reference image, i.e. the color sample image prior to adjustment. Thus, the user can compare the two images to verify the particulars of tone application selected by himself by means of the specified point Pcc.

F. Variations

The invention is not limited to the examples and embodiments set forth hereinabove, but can be reduced to practice in various modes without departing from the spirit thereof, such as the following variations for example.

F1. Variation 1

In Embodiment 1, the color circle 210 is an a*b* plane where L* is 55. However, the color circle 210 is not limited to this. That is, the color circle could be one having at its center a gray point having a gray color which can be represented by lightness only, with color saturation and/or hue differing gradationally depending on location, at locations within the color circle.

F2. Variation 2

In Embodiment 1, the color conversion curves are generated as quadratic curves see (FIG. 5). However, color conversion curves could be generated as third order curves, fourth order curves, Bezier curves, or other curves. That is, it is sufficient for a color conversion curve to afford conversion of color represented by (R0, G0, B0) in the sRGB color system into the (R1, G1, B1) specified by the specified point.

In preferred practice, the color conversion curves will convert color represented by (0, 0, 0) in the sRGB color system to (0, 0, 0), and convert color represented by (Rmax, Gmax, Bmax) to color represented by (Rmax, Gmax, Bmax). More preferably, the color conversion curves will be monotonically increasing curves.

Where the color conversion curves are third order curves, fourth order curves, Bezier curves, or the like, when generating a color conversion curves, it is preferred practice to specify a plurality of points besides (0, 0) and (Rmax, Rmax) through which the curve will pass (see FIG. 5). For example, using the red tone value for the purposes of description, where a third order curve is used, it is preferable to specify, in addition to the point (R0, R1) representing conversion of tone value R0 to tone value R1, a point (R2, R3) representing conversion of tone value R2 to tone value R3. Where a fourth order curve is used, it is preferable to additionally specify a point (R4, R5) representing conversion of tone value R4 to tone value R5.

When generating a color conversion curve, a quadratic curve can be used as the initial curve, and then the quadratic curve can be modified in part to produce a color conversion curve. For example, where a portion of a quadratic curve passing through point (0, 0), point (255, 255), and point (R0, R1) goes above the maximum value Rmax for tone values, that portion may assume a constant value equal to Rmax. Where a portion of a quadratic curve passing through point (0, 0), point (255, 255), and point (R0, R1) goes below 0, that portion may assume a constant value of 0.

The lightness parameter used in adjustment of lightness can be as follows. For example, the red lightness parameter Lr can be a coefficient which is multiplied by R1 of the point (R0, R1) through which the color conversion curve Cr (see FIG. 5) passes, in order to increase or decrease R1. When adjusting lightness, there can be employed a mode whereby the color conversion curve Cr is generated such that the original tone value R0 is converted to a tone value R1' generated by multiplying Lr by R1. As described previously in Embodiment 1, the conversion curve can be generated in the form of a quadratic curve, or in the form of another curve mentioned previously. The procedure is the same for the lightness parameters for other colors.

F3. Variation 3

In Embodiment 2, application of tone (see Steps S20, S30 of FIG. 2), specification of lightness (see Steps S50, S60 of FIG. 2), and specification of contrast (see Steps S100, S110) are carried out in that order. However, these processes may be carried out in any order. The processes may also be carried out one at a time to execute printing.

Additionally, a user may operate the color tone selecting portion 250 to select a setting for a parameter specifying a color tone to be applied to the image, from among a number of presets. Preset parameter settings could include cool-hued cool tones, warm-hued warm tones, and a sepia tone color shade resembling a discolored photograph.

Also, a user could input a gamma value via the gamma value specifying portion 260 (see FIG. 3) of the tone setting screen 200, to be used when performing gamma correction of an image.

F4. Variation 4

In Embodiment 3, the color conversion specified by the specified point converts gray having the same lightness as the specified point into a specified point represented by (R1, G1, B1). However, in an embodiment having the color circle 213 of Embodiment 3, the color conversion specified by the specified point could instead convert the color of the center point O3 into a specified point represented by (R1, G1, B1), in the same manner as in Embodiment 1.

F5. Variation 5

In the embodiments hereinabove, the color sample image displayed in the sample image display area 220 is an image derived by subjecting preliminary image data PID to predetermined resolution conversion, which image has then been subjected to tone conversion, lightness conversion, contrast conversion, and so on. However, the color sample image displayed in the sample image display area 220 could instead by one selected appropriately by the user from among a plurality of types of monochrome images prepared in advance. The plurality of types of monochrome images prepared in advance could include landscape images, portrait images, images of pictorial art, and the like.

In preferred practice, the plurality of types of monochrome images prepared in advance will be displayed on the CRT display 21 when a print command is issued by the application 95 and the tone setting screen of the printer driver 96 is displayed. In such an embodiment, the user will be able to select a color sample image appropriate to the image to be printed. The printer driver 96 displays the selected color sample image in the sample image display area 220, carries out image conversion according to the set parameters, and redisplays the image in the sample image display area 220.

F6. Variation 6

In Embodiment 4, the triangle associated with the color circle is a triangle having its vertices at points of cyan=100%, magenta=100%, and yellow=100%. However, the triangle associated with the color circle could instead be a triangle having its vertices at points of red=100%, green=100%, and blue=100%. In such a triangle, RGB intensity can be determined on the basis of length of a perpendicular lines from the corresponding point to each side, and RGB intensity then converted to CMY intensity, and used for adding a color tone to image data for printing.

F7. Variation 7

In the embodiments hereinabove, the tone setting screen 200 has a color circle as an area for the user to specify a tone for application to a monochrome image. However, the area for the user to specify a tone for application to a monochrome image is not limited to a circular shape. For example, an embodiment in which the CMY color triangle in Embodiment 4 is displayed would be possible as well. With such an embodiment, mapping of points in the color circle to points in the CMY color triangle becomes unnecessary.

F8. Variation 8

In the embodiments hereinabove, three kinds of ink, namely, C, M and Y are used as chromatic inks, but it would be possible to use other chromatic inks, or light and dark chromatic inks of the same color system. The invention is also applicable in instances in which it is possible to utilize at least a single type of chromatic ink for printing monochrome images. However, instances in which it is possible to utilize two or more types of chromatic ink are preferred due to the higher degree of freedom in setting a color tone, with instances in which it is possible to utilize three or more types of chromatic ink being especially preferred. Also, in preferred practice it will be possible to use at least one type of ink as achromatic ink.

F9. Variation 9

In Embodiment 5, in the tone setting screen 200a, the reference image display area 222 for displaying predetermined color sample images, and the sample image display area 220 for displaying color sample images after application of tone thereto are displayed side by side (see FIG. 20). However, some other embodiment for the tone setting screen would be possible.

For example, an embodiment wherein the tone setting screen has a first sample image display area for displaying a print image being edited, the print image being displayed as it appears prior to application of tone, and a second sample image display area for displaying the image generated by applying specified tone to the print image, would also be possible. Also possible is an embodiment wherein the tone setting screen has a reference image display area 222, a sample image display area 220, and first and second sample image display areas. Also, there could be provided areas for respectively displaying, prior to specification of a color tone to be applied, a prepared color sample image (reference image), and the print image being edited, prior to application of tone thereto; and after a color tone to be applied has been specified, respectively displaying the color sample image after tone application, and the print image after tone application. By means of such an embodiment, the user can more easily verify applied tone.

Also, in Embodiment 5, a black-and-white image represented by lightness only was given as an exemplary color sample image (reference image) prepared in advance. However, other embodiments for the reference image prepared in advance would be possible as well. For example, the reference image could be a black-and-white image represented by pixel lightness or luminance only. Or, the reference image could be a black-and-white image in which color of each point is represented by red (R), green (G), and blue (B) tone values, with the RGB tone values at each point having mutually equal values.

The reference image could also be an image in which color of each point is represented by tone values of one color selected from red (R), green (G), and blue (B). Such an image would be represented by color density of one color selected from red (R), green (G), and blue (B). The reference image could also be an image in which color of each pixel can be represented respectively by a single tone value. For example, such an image could be one in which predetermined colors with respectively different lightness are associated in advance with a plurality of predetermined numerical values (tone values), e.g. 0-255, with each pixel of the image respectively having one of the plurality of predetermined numerical values (tone values). Color of pixels of such an image may have predetermined saturation and hue respectively, and may not differ from one another only in density (lightness), i.e. colors in the gray scale. For example, the reference image could be a monochromatic image which can be generated by applying a predetermined color tone such as a cool tone, warm tone, or sepia tone to an achromatic image. That is, the reference image can be an image in which color of pixels is one color in a predetermined color series composed of a plurality of colors of different lightness. The color series is preferably a collection of a plurality of colors with substantially same hue and mutually different lightness. The color series is, for example, the colors made by applying a predetermined color tone, such as a cool tone, warm tone, or sepia tone, to a colors in the gray scale.

The image undergoing editing is not limited to a black-and-white image represented by lightness only, but could instead be a color image. Images undergoing editing can be images like those described above with regard to the reference image, or images in which pixel color is one color in a predetermined color series composed of a plurality of colors of different lightness.

F10. Variation 10

In Embodiment 5, when creating the color conversion curves, the color conversion curves are created using color data that represents as-is the display color of points in the color circle. However, when creating the color conversion curves, the color conversion curves could instead be created using color data which is associated with each point in the color circle, but represents color different from the display color of that point.

In preferred practice, the color saturation Cd of image data associated with those points will increase monotonically with respect to distance D of points from the center point O. Specifically, saturation is preferably lower the closer a point is to the center point O. Also, in preferred practice the change in saturation Cd of display colors of points with respect to the distance D of points from the center point O will be equivalent in each direction, with the center point O as the center. The color of color data associated with points within the color circle 210a can be a color of given lightness, for example, colors for which lightness L*=55.

In Embodiment 5, saturation of points of the color circle varies according to distance from the center point, in the manner of FIG. 21. However, saturation of points of the color circle could be given by some other embodiment. For example, a quadratic curve that bows downwardly overall, a third order curve, or an exponential function would also be acceptable. Partial incorporation of such curves is also possible. Further, the line determining saturation Cv with respect to distance D from the center point O may be a straight line of slope c1 in a first area that includes the center point, and a straight line of slope c2 greater than c1 in a second area situated to the outside of the first area.

However, in preferred practice, saturation Cv of points in the first area that includes the center point will be located below with respect to a straight line L0 at which Cv=c×D; whereas display color of points in the second area situated to the outside of the first area will be located above line L0, or situated on line L0. In other words, saturation of points within the first area will preferably be lower than saturation determined by line L0, while saturation of points within the second area will preferably be equal to or greater than saturation determined by line L0.

The second area being "situated to the outside" of the first area means as follows. The point corresponding to the color having the lowest saturation is deemed the reference point. "Being situated to the outside" means that, of the color specifying area (color circle), the distance Dmax2 from the reference point of that portion of the second area furthest away from the reference point is greater than the distance Dmax1 from the reference point of that portion of the first area furthest away from the reference point. Also, in Embodiment 1, this reference point is the center point O corresponding to the achromatic color a*=b*=0.

F11. Variation 11

In Embodiment 5, the embodiment is one wherein, in the color patch 320, there is displayed the color displayed at the specified point Pcc on the screen. However, where display color of points of the color circle and the color of color data associated with points are different, as in Variation 10, the color of color data associated with the specified point Pcc may be displayed in the color patch 320.

In Embodiment 5, the gray patch displays the color of the center point O of the color circle 210a, and the color patch 320 displays the color of the specified point Pcc. In the color circle 210a, the color displayed on the screen (i.e. color of color data associated with each point) is a color with a given L* in the L*a*b* color system. However, an embodiment in which a gray patch and a color patch are displayed could be employed in an embodiment having a color circle based on RGB as in Embodiment 3, or in an embodiment having a color circle based on CMY as in Embodiment 4.

In an embodiment having a color circle based on RGB as in Embodiment 3, in preferred practice, the gray patch will display gray having the same lightness as the specified point Pcc3. In preferred practice, the color patch will display the color of the specified point Pcc3. The color of color data associated with the specified point Pcc3 is acceptable as well.

F12. Variation 12

In Embodiment 5, the printing one-dimensional lookup table 104c is a table that, as a result of color conversion, converts color reproduced on printing paper to color of saturation lower than that of color identified by the color data of the specified point Pcc. As in Embodiment 1, the color circle is a plane with a given L* in the L*a*b* color system. However, a similar embodiment would be preferred in an embodiment having a color circle based on RGB as in Embodiment 3, or in an embodiment having a color circle based on CMY as in Embodiment 4. That is, in preferred practice the printing one-dimensional lookup table 104c will be a table that, as a result of color conversion, converts color reproduced on printing paper to color of saturation lower than that of color associated with the specified point. According to such an embodiment, in printing, the user can obtain tone application close to tone application recognized through the visual sense.

F13. Variation 13

In the embodiments hereinabove, some of the arrangements realized through hardware could be replaced by software, and conversely some of the arrangements realized through software could be replaced by hardware. For example, some of the functions of the printer driver 96 (see FIG. 1) could be executed by the printer CPU 41.

A computer program for realizing such functions could be provided in a form recorded on a floppy disk, CR-ROM, or other computer-readable recording medium. A host computer may read the computer program from the recording medium and transfer it to an internal storage device or an external storage device. Alternatively, the computer program may be provided to the host computer from a program supplying device, via a communications pathway. When realizing the functions of a computer program, the computer program stored in an internal storage device is executed by the microprocessor of the host computer. Alternatively, the computer program recorded on the recording medium can be executed directly by the host computer.

Herein, "computer" refers to a concept that includes hardware devices and an operating system, and means that the hardware devices operate under the control of the operating system. A computer program realizes the functions of the parts described above, on such a computer. Some of the aforementioned functions can be realized by the operating system, rather than by an application program.

Herein, "computer-readable recording medium" is not limited to flexible disks, CR-ROM, or other portable recording media, but can include computer internal storage devices such various kinds of RAM and ROM, as well as hard disks and other external storage devices fixed to the computer.

In the embodiments hereinabove, the computer 90 is connected to a CRT display 21, but the display device for displaying the tone setting screen 200 of the printer driver 96 could instead be an LCD display, plasma display, projector and projection screen, or other means.

The Program product may be realized as many aspects. For example:

(i) Computer readable medium, for example the flexible disks, the optical disk, or the semiconductor memories;

(ii) Data signals, which comprise a computer program and are embodied inside a carrier wave;

(iii) Computer including the computer readable medium, for example the magnetic disks or the semiconductor memories; and (iv) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. Printing control method for generating a conversion table for adding a color tone to a print target image before printing, the method comprising:

displaying a tone setting screen that includes:
a tone specifying portion for specifying a plurality of color tone parameters that specify a color tone;

specifying the plurality of color tone parameters through the tone specifying portion; and based on the specified plurality of color tone parameters, generating a printing conversion table used for adding a color tone to a print target image to be printed, wherein the tone specifying portion has a tone specifying area for specifying the plurality of color tone parameters with a single specified point, the tone specifying area being arranged so as to enable visual recognition of a color tone specified by the specified plurality of color tone parameters, the specifying of the plurality of color tone parameters includes specifying the specified point within the tone specifying area, the tone specifying area includes a specified plane for which a lightness L* in L*a*b* color system is a predetermined fixed lightness, and values for a* and b* in L*a*b* color system respectively lie within predetermined ranges, the specified plane includes a specific point, and a color of each point in the specified plane has lower saturation the closer the point is to the specific point, where D is distance of each point in the specified plane from the specific point, and c is a positive number, saturation Cv1 of each point within a first area contained within the specified plane and including the specific point fulfills a condition Cv1<c×D, and saturation CV2 of each point within a second area located outside the first area fulfills a condition Cv2≧c×D, and wherein each of the method operations of the printing control method is executed by a processor.

2. Printing control method according to claim 1 wherein the tone setting screen further includes:
   a sample image display area for displaying a sample image, and the method further comprises:
   based on the specified plurality of color tone parameters, generating a display conversion table used for adding the color tone to a reference image;
   generating the sample image by adding the color tone to the reference image with reference to the display conversion table, and displaying the sample image in the sample image display area, and
   the generating of the display conversion table includes calculating the plurality of color tone parameters according to location of the specified point within the tone specifying area.

3. Printing control method according to claim 2 wherein the reference image is an image in which color of pixels is one color in a predetermined color series, the color series being a collection of a plurality of colors with substantially same hue and mutually different lightness.

4. Printing control method according to claim 3 wherein the tone setting screen further comprises a reference image display area for displaying the reference image.

5. Printing control method according to claim 2 wherein the print target image is an image in which color of each pixel is color in a predetermined color series, the color series being a collection of a plurality of colors with substantially same hue and mutually different lightness.

6. Printing control method according to claim 5 further comprising selecting the reference image from among a plurality of candidate images prepared in advance.

7. Printing control method according to claim 5 further comprising:
   receiving the print target image; and wherein
   the generating of the sample image includes selecting the print target image as the reference image.

8. Printing control method according to claim 5 wherein the step of generating the printing conversion table includes:
   providing
      a reference printing conversion table for converting image data to ink amount data without changing colors represented by the image data, and
      an ink intensity table representing correspondence between combinations of various values of the color tone parameters and ink color intensities; and
   generating the printing conversion table from the reference printing conversion table with reference to the ink intensity table and the specified plurality of color tone parameters.

9. Printing control method according to claim 2 wherein the display conversion table is configured to convert colors of pixels in the reference image to other colors, wherein, in the conversion using the display conversion table,
   a color having the fixed lightness is converted to another color having the fixed lightness,
   a color having a lightness higher than the fixed lightness is convened to another color having a lightness higher than the fixed lightness, and
   a color having a lightness lower than the fixed lightness is converted to another color having a lightness lower than the fixed lightness.

10. Printing control method according to claim 9 wherein the tone setting screen includes a lightness adjusting portion for specifying a lightness adjustment parameter relating to a lightness of the print target image, and
    the method further comprises:
    specifying the lightness adjustment parameter through the lightness adjusting portion; and
    modifying the display conversion table in accordance with the specified lightness adjustment parameter.

11. Printing control method according to claim 9 wherein the tone specifying area includes an a*b* plane for which a lightness L* in L*a*b* color system is the fixed lightness, and
    the display conversion table is configured to convert a color identified by a*=b*=0 in the a*b* plane to a color identified by the specified point.

12. Printing control method according to claim 11 wherein the display conversion table is configured to convert a first color identified by a*=b*=0 to a second color having a lower saturation than a saturation of the color identified by the specified point, wherein a lightness L* of the first color in the L*a*b* color system is the fixed lightness.

13. Printing control method according to claim 11 further comprising:
    displaying on the tone setting screen a patch of the color identified by a*=b*=0; and
    displaying on the tone setting screen a patch of the color identified by the specified point.

14. Printing control method for generating a conversion table for adding a color tone to a print target image before printing, the method comprising:
    displaying a tone setting screen that includes:
       a tone specifying portion for specifying a plurality of color tone parameters that specify a color tone;
    specifying the plurality of color tone parameters through the tone specifying portion; and
    based on the specified plurality of color tone parameters, generating a printing conversion table used for adding a color tone to a print target image to be printed, wherein
    the tone specifying portion has a tone specifying area for specifying the plurality of color tone parameters with a single specified point, the tone specifying area being arranged so as to enable visual recognition of a color tone specified by the specified plurality of color tone parameters,
    the specifying of the plurality of color tone parameters includes specifying the specified point within the tone specifying area,
    the tone specifying area is a color circle having at a center a gray point having a gray color which can be represented by lightness only, and wherein depending on a location within the tone specifying area, saturation and/or hue of a color at each location differ gradationally,
    points within the color circle are mapped to corresponding points within an ink color triangle which is a hypothetical equilateral triangle that corresponds to the color circle,
    the ink color triangle has a center in common with the color circle, and is arranged such that intensities of ink colors at the corresponding point are determined with reference to lengths of three perpendicular lines extending from the corresponding point to three sides of the ink color triangle, and the generating of the printing conversion table includes:
  providing a reference printing conversion table for converting image data to ink amount data without changing colors represented by the image data;
  calculating the intensities of the ink colors with reference to the lengths of the three perpendicular lines; and
  generating the print conversion table from the reference printing conversion table based on the intensities of the ink colors, and wherein
each of the method operations of the printing control method is executed by a processor.

15. Printing control method according to claim 14 wherein the tone setting screen further includes:
  a sample image display area for displaying a sample image, and
the method further comprises:
  based on the specified plurality of color tone parameters, generating a display conversion table used for adding the color tone to a reference image;
  generating the sample image by adding the color tone to the reference image with reference to the display conversion table, and displaying the sample image in the sample image display area, wherein
the generating of the display conversion table includes:
  providing a tone parameter table representing correspondence between combinations of various values of the intensities of the ink colors and the color tone parameters; and
  determining the color tone parameters based on the calculated intensities of the ink colors with reference to the tone parameter table.

16. Printing control method according to claim 15 wherein the display conversion table is configured to convert colors of pixels in the reference image to other colors, wherein, in the conversion using the display conversion table,
  a color having a predetermined fixed lightness is converted to another color having the fixed lightness,
  a color having a lightness higher than the fixed lightness is converted to another color having a lightness higher than the fixed lightness, and
  a color having a lightness lower than the fixed lightness is converted to another color having a lightness lower than the fixed lightness, and wherein
the fixed lightness is L*=40–60 in L*a*b* color system.

17. Printing control method according to claim 16 wherein the printing conversion table is configured to convert image data to ink amount data with changing colors represented by the image data, wherein, in the conversion using the printing conversion table,
  a color having the fixed lightness is converted to a color having lower saturation than saturation of the another color having the fixed lightness.

18. Printing control method according to claim 16 further comprising:
  displaying on the tone setting screen a patch of achromatic color having the fixed lightness; and
  displaying on the tone setting screen a patch of the another color having the fixed lightness.

19. A computer program product for generating a conversion table for adding a color tone to a print target image before printing, the computer program product comprising:
  a computer readable recording medium; and
  a computer program stored on the computer readable recording medium, the computer program comprising:
    a first portion for displaying a tone setting screen that includes a tone specifying portion for specifying a plurality of color tone parameters that specify a color tone;
    a second portion for receiving specification of the plurality of color tone parameters through the tone specifying portion; and
    a third portion for, based on the specified plurality of color tone parameters, generating a printing conversion table used for adding a color tone to a print target image to be printed, wherein
  the tone specifying portion has a tone specifying area for specifying the plurality of color tone parameters with a single specified point, the tone specifying area being arranged so as to enable visual recognition of a color tone specified by the specified plurality of color tone parameters,
  the specification of the plurality of color tone parameters includes specification of the specified point within the tone specifying area,
  the tone specifying area includes a specified plane for which a lightness L* in L*a*b* color system is a predetermined fixed lightness, and values for a* and b* in L*a*b* color system respectively lie within predetermined ranges,
  the specified plane includes a specific point, and
  a color of each point in the specified plane has lower saturation the closer the point is to the specific point,
  where D is distance of each point in the specified plane from the specific point, and c is a positive number,
  saturation Cv1 of each point within a first area contained within the specified plane and including the specific point fulfills a condition
  Cv1<c×D, and
  saturation Cv2 of each point within a second area located outside the first area fulfills a condition
  Cv2≧c×D.

20. A computer program product for generating a conversion table for adding a color tone to a print target image before printing, the computer program product comprising:
  a computer readable recording medium; and
  a computer program stored on the computer readable recording medium, the computer program comprising:
    a first portion for displaying a tone setting screen that includes a tone specifying portion for specifying a plurality of color tone parameters that specify a color tone;
    a second portion for specifying the plurality of color tone parameters through the tone specifying portion;
    a third portion for, based on the specified plurality of color tone parameters, generating a printing conversion table used for adding a color tone to a print target image to be printed, wherein
  the tone specifying portion has a tone specifying area for specifying the plurality of color tone parameters with a single specified point, the tone specifying area being arranged so as to enable visual recognition of a color tone specified by the specified plurality of color tone parameters,
  the specifying of the plurality of color tone parameters includes specifying the specified point within the tone specifying area,
  the tone specifying area is a color circle having at a center a gray point having a gray color which can be represented by lightness only, and wherein depending on a location within the tone specifying area, saturation and/or hue of a color at each location differ gradationally, points within the color circle are mapped to corresponding points within an ink color triangle which is a hypothetical equilateral triangle that corresponds to the color circle, the ink color triangle has a center in common with the color circle, and is arranged such that intensities of ink colors at the corresponding point are determined with reference to lengths of three perpendicular lines extending from the corresponding point to three sides of the ink color triangle, and the generating of the printing conversion table includes:
provviding a reference printing conversion table for converting image data to ink amount data without changing colors represented by the image data;
calculating the intensities of the ink colors with reference to the lengths of the three perpendicular lines; and
generating the print conversion table from the reference printing conversion table based on the intensities of the ink colors.

* * * * *